(12) United States Patent
Chen et al.

(10) Patent No.: US 12,356,004 B2
(45) Date of Patent: Jul. 8, 2025

(54) INTRA BLOCK COPY (IBC) CANDIDATE LIST CONSTRUCTION WITH MOTION INFORMATION OF INTRA TEMPLATE-MATCHING PREDICTION

(71) Applicant: Tencent America LLC, Palo Alto, CA (US)

(72) Inventors: Lien-Fei Chen, Hsinchu (TW); Guichun Li, San Jose, CA (US); Xin Zhao, San Jose, CA (US); Xiaozhong Xu, State College, PA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 133 days.

(21) Appl. No.: 17/984,864

(22) Filed: Nov. 10, 2022

(65) Prior Publication Data

US 2024/0022763 A1 Jan. 18, 2024

Related U.S. Application Data

(60) Provisional application No. 63/388,913, filed on Jul. 13, 2022.

(51) Int. Cl.
*H04N 19/11* (2014.01)
*H04N 19/105* (2014.01)
*H04N 19/132* (2014.01)
*H04N 19/139* (2014.01)
*H04N 19/159* (2014.01)
*H04N 19/172* (2014.01)
*H04N 19/176* (2014.01)
(Continued)

(52) U.S. Cl.
CPC ......... *H04N 19/593* (2014.11); *H04N 19/105* (2014.11); *H04N 19/11* (2014.11);
(Continued)

(58) Field of Classification Search
CPC .......................... H04N 19/593; H04N 19/11
See application file for complete search history.

(56) References Cited

U.S. PATENT DOCUMENTS

2020/0029091 A1\* 1/2020 Chien ................. H04N 19/176
2020/0053361 A1\* 2/2020 Robert ................ H04N 19/573
(Continued)

OTHER PUBLICATIONS

High Efficiency Video Coding, Rec. ITU-T H.265 v4 Dec. 2016, pp. 1-664.
(Continued)

*Primary Examiner* — Jeffery A Williams
(74) *Attorney, Agent, or Firm* — ArentFox Schiff LLP

(57) ABSTRACT

Aspects of the disclosure provide a method and an apparatus for video decoding. The apparatus includes processing circuitry that receives a coded bitstream comprising a first block in a current picture. The processing circuitry obtains prediction information indicating whether the first block is coded in an intra template matching prediction (IntraTMP) mode. If the IntraTMP mode is applied to the first block, the first block is reconstructed based on a prediction block within a reconstructed search area in the current picture. A reference template of the prediction block is matched to a current template of the first block in the IntraTMP mode. An IntraTMP-based block vector $BV_{IntraTMP}$ of the first block is stored. The IntraTMP-based block vector indicates a position displacement between the current template of the first block and the reference template of the prediction block. A second block is reconstructed based on the stored IntraTMP-based block vector.

20 Claims, 21 Drawing Sheets

(51) Int. Cl.
*H04N 19/423* (2014.01)
*H04N 19/52* (2014.01)
*H04N 19/593* (2014.01)
*H04N 19/70* (2014.01)
*H04N 19/88* (2014.01)

(52) U.S. Cl.
CPC ......... *H04N 19/132* (2014.11); *H04N 19/139* (2014.11); *H04N 19/159* (2014.11); *H04N 19/172* (2014.11); *H04N 19/176* (2014.11); *H04N 19/423* (2014.11); *H04N 19/52* (2014.11); *H04N 19/70* (2014.11); *H04N 19/88* (2014.11)

(56) References Cited

U.S. PATENT DOCUMENTS

2024/0031557 A1\* 1/2024 Ruiz Coll ............ H04N 19/136
2024/0259555 A1\* 8/2024 Zhang .................. H04N 19/176

OTHER PUBLICATIONS

ITU-T and ISO/IEC, "Versatile Video Coding", ITU-T Rec. H.266 and ISO/IEC 23090-3, 2020, pp. 1-516.
M. Coban, et al., "Algorithm description of Enhanced Compression Model 5 (ECM5)", ISO/IEC JTC1/SC29 JVET-Z2025, Apr. 2022, pp. 1-45.

\* cited by examiner

FIG. 16

INTRA BLOCK COPY (IBC) CANDIDATE LIST CONSTRUCTION WITH MOTION INFORMATION OF INTRA TEMPLATE-MATCHING PREDICTION

INCORPORATION BY REFERENCE

The present application claims the benefit of priority to U.S. Provisional Application No. 63/388,913, "IBC Candidate List Construction By Using the Motion Data of Intra Template-Matching Prediction" filed on Jul. 13, 2022, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Uncompressed digital images and/or video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or Hz. Uncompressed image and/or video has specific bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of image and/or video coding and decoding can be the reduction of redundancy in the input image and/or video signal, through compression. Compression can help reduce the aforementioned bandwidth and/or storage space requirements, in some cases by two orders of magnitude or more. Although the descriptions herein use video encoding/decoding as illustrative examples, the same techniques can be applied to image encoding/decoding in similar fashion without departing from the spirit of the present disclosure. Both lossless compression and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform processing, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding used in, for example, MPEG-2 generation coding technologies, does not use intra prediction. However, some newer video compression technologies include techniques that attempt to perform prediction based on, for example, surrounding sample data and/or metadata obtained during the encoding and/or decoding of blocks of data. Such techniques are henceforth called "intra prediction" techniques. Note that in at least some cases, intra prediction is using reference data only from the current picture under reconstruction and not from reference pictures.

There can be many different forms of intra prediction. When more than one of such techniques can be used in a given video coding technology, a specific technique in use can be coded as a specific intra prediction mode that uses the specific technique. In certain cases, intra prediction modes can have submodes and/or parameters, where the submodes and/or parameters can be coded individually or included in a mode codeword, which defines the prediction mode being used. Which codeword to use for a given mode, submode, and/or parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values of already available samples. Sample values of neighboring samples are copied into the predictor block according to a direction. A reference to the direction in use can be coded in the bitstream or may itself be predicted.

Referring to FIG. 1A, depicted in the lower right is a subset of nine predictor directions known from the 33 possible predictor directions (corresponding to the 33 angular modes of the 35 intra modes) defined in H.265. The point where the arrows converge (101) represents the sample being predicted. The arrows represent the direction from which the sample is being predicted. For example, arrow (102) indicates that sample (101) is predicted from a sample or samples to the upper right, at a 45 degree angle from the horizontal. Similarly, arrow (103) indicates that sample (101) is predicted from a sample or samples to the lower left of sample (101), in a 22.5 degree angle from the horizontal.

Still referring to FIG. 1A, on the top left there is depicted a square block (104) of 4×4 samples (indicated by a dashed, boldface line). The square block (104) includes 16 samples, each labelled with an "S", its position in the Y dimension (e.g., row index) and its position in the X dimension (e.g., column index). For example, sample S21 is the second sample in the Y dimension (from the top) and the first (from the left) sample in the X dimension. Similarly, sample S44 is the fourth sample in block (104) in both the Y and X dimensions. As the block is 4×4 samples in size, S44 is at the bottom right. Further shown are reference samples that follow a similar numbering scheme. A reference sample is labelled with an R, its Y position (e.g., row index) and X position (column index) relative to block (104). In both H.264 and H.265, prediction samples neighbor the block under reconstruction; therefore, no negative values need to be used.

Intra picture prediction can work by copying reference sample values from the neighboring samples indicated by the signaled prediction direction. For example, assume the coded video bitstream includes signaling that, for this block, indicates a prediction direction consistent with arrow (102)—that is, samples are predicted from samples to the upper right, at a 45 degree angle from the horizontal. In that case, samples S41, S32, S23, and S14 are predicted from the same reference sample R05. Sample S44 is then predicted from reference sample R08.

In certain cases, the values of multiple reference samples may be combined, for example through interpolation, in order to calculate a reference sample; especially when the directions are not evenly divisible by 45 degrees.

The number of possible directions has increased as video coding technology has developed. In H.264 (year 2003), nine different direction could be represented. That increased to 33 in H.265 (year 2013). Currently, JEM/VVC/BMS can support up to 65 directions. Experiments have been conducted to identify the most likely directions, and certain techniques in the entropy coding are used to represent those likely directions in a small number of bits, accepting a certain penalty for less likely directions. Further, the directions themselves can sometimes be predicted from neighboring directions used in neighboring, already decoded, blocks.

FIG. 1B shows a schematic (110) that depicts 65 intra prediction directions according to JEM to illustrate the increasing number of prediction directions over time.

The mapping of intra prediction direction bits that represent the direction in the coded video bitstream can be different from video coding technology to video coding technology. Such mapping can range, for example, from simple direct mappings, to codewords, to complex adaptive schemes involving most probable modes, and similar techniques. In most cases, however, there can be certain directions that are statistically less likely to occur in video content than certain other directions. As the goal of video compression is the reduction of redundancy, those less likely directions will, in a well working video coding technology, be represented by a larger number of bits than more likely directions.

Image and/or video coding and decoding can be performed using inter-picture prediction with motion compensation. Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described with reference to FIG. 2 is a technique henceforth referred to as "spatial merge".

Referring to FIG. 2, a current block (201) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (202 through 206, respectively). In H.265, the MV prediction can use predictors from the same reference picture that the neighboring block is using.

SUMMARY

Aspects of the disclosure provide methods and apparatuses for video encoding and decoding. In some examples, an apparatus for video decoding includes processing circuitry. The processing circuitry receives a coded video bitstream comprising a first block in a current picture. The processing circuitry obtains prediction information indicating whether the first block is coded in an intra template matching prediction (IntraTMP) mode. In response to the IntraTMP mode being applied to the first block, the processing circuitry reconstructs the first block based on a prediction block within a reconstructed search area in the current picture. A reference template of the prediction block is matched to a current template of the first block in the IntraTMP mode. The processing circuitry stores an IntraTMP-based block vector $BV_{IntraTMP}$ of the first block. The IntraTMP-based block vector $BV_{IntraTMP}$ indicates a position displacement (also referred to as a motion vector displacement) between the current template of the first block and the reference template of the prediction block. The processing circuitry reconstructs a second block based on the stored IntraTMP-based block vector $BV_{IntraTMP}$. The second block can be coded in either an Intra Block Copy (IntraBC) mode (also referred to as an IBC mode) or the IntraTMP mode. In an example, the second block is in the current picture.

In an example, the first block includes one or more M×N units. The processing circuitry stores the IntraTMP-based block vector $BV_{IntraTMP}$ in each M×N unit of the first block. In an example, the processing circuitry stores the IntraTMP-based block vector $BV_{IntraTMP}$ with a pre-defined allowed precision.

In an example, the processing circuitry stores the IntraTMP-based block vector $BV_{IntraTMP}$ with a precision indicated by syntax information in the coded video bitstream.

The processing circuitry can determine the reference template based on multiple template candidates within the reconstructed search area in the current picture. A position displacement between one of the multiple template candidates and the current template can be indicated by a vector that is (i) a block vector (BV) of a third block coded with an intra block copy (IBC) mode or (ii) an IntraTMP-based block vector $BV_{IntraTMP}$ of the third block coded with the IntraTMP mode.

In an example, the processing circuitry stores the IntraTMP-based block vector $BV_{IntraTMP}$ based on a template matching cost between the reference template of the prediction block and the current template of the first block being less than a threshold.

In an example, the processing circuitry stores a template matching cost between the reference template of the prediction block and the current template of the first block.

The template matching cost can be normalized based on a number of samples in the current template.

In an embodiment, the processing circuitry decodes prediction information of a first block in a current picture from a coded video bitstream. The prediction information indicates that an intra block copy (IBC) mode is applied to the first block. The processing circuitry can construct an IBC candidate list of the first block. The IBC candidate list includes a first candidate that is based on an intra template matching prediction (IntraTMP)-based block vector $BV_{IntraTMP}$ of a second block coded with an IntraTMP mode. The second block can be one of (i) a reconstructed block in the current picture and (ii) a temporal neighbor of the first block. The processing circuitry can reconstruct the first block based on the IBC candidate list.

In an example, the processing circuitry performs template matching on the IntraTMP-based block vector $BV_{IntraTMP}$ to refine the block displacement vector and determines the first candidate as the template-matched IntraTMP-based block vector $BV_{IntraTMP}$.

In an example, the IBC candidate list of the first block includes multiple candidates. Each of the multiple candidates can be based on one of (i) an IntraTMP-based block vector $BV_{IntraTMP}$ of a block coded with the IntraTMP mode and (ii) a block vector (BV) of a block coded with the IBC mode. The multiple candidates can include the first candidate. The processing circuitry can perform template matching on the multiple candidates by determining, for each of the multiple candidates, a respective template matching cost based on a reference template of a reference block and a current template of the first block. The processing circuitry can reorder the multiple candidates based on the determined template matching costs. The processing circuitry can reconstruct the first block based on the reordered multiple candidates in the IBC candidate list.

In an example, for each of the multiple candidates that is an IntraTMP-based block vector $BV_{IntraTMP}$, the processing circuitry applies a scaling factor to the template matching cost of the respective candidate.

In an example, a number of one or more candidates in the IBC candidate list that are IntraTMP-based block vectors $BV_{S_{IntraTMP}}$ of respective blocks coded with the IntraTMP mode is less than or equal to a threshold. The one or more candidates include the first candidate.

In an example, the number of the one or more candidates in the IBC candidate list equals the threshold. A third block is one of (i) a reconstructed block in the current picture and (ii) a temporal neighbor of the first block. For a new IntraTMP-based block vector $BV_{IntraTMP}$ of the third block that is not in the IBC candidate list, if template-matching cost associated with the new IntraTMP-based block vector $BV_{IntraTMP}$ is smaller than a template-matching cost associated with at least one of the one or more candidates, the processing circuitry can replace a candidate of the one or more candidates with the new IntraTMP-based block vector $BV_{IntraTMP}$. The replaced candidate can have the largest template-matching cost among the one or more candidates.

In an example, the processing circuitry can add one or more candidates from one or more blocks coded with the IBC mode to the IBC candidate list.

In an example, the IntraTMP-based block vector $BV_{IntraTMP}$ of the second block is obtained from a block vector (BV) history table storing one or more BVs or one or more block displacement vectors of at least one previously coded block in the current picture.

Aspects of the disclosure also provide a non-transitory computer-readable storage medium storing a program executable by at least one processor to perform the methods for video decoding.

BRIEF DESCRIPTION OF THE DRAWINGS

Further features, the nature, and various advantages of the disclosed subject matter will be more apparent from the following detailed description and the accompanying drawings in which:

FIG. 16 shows an example of a reference area for coding a coding tree unit (CTU).

DETAILED DESCRIPTION OF EMBODIMENTS

Figure 1A:
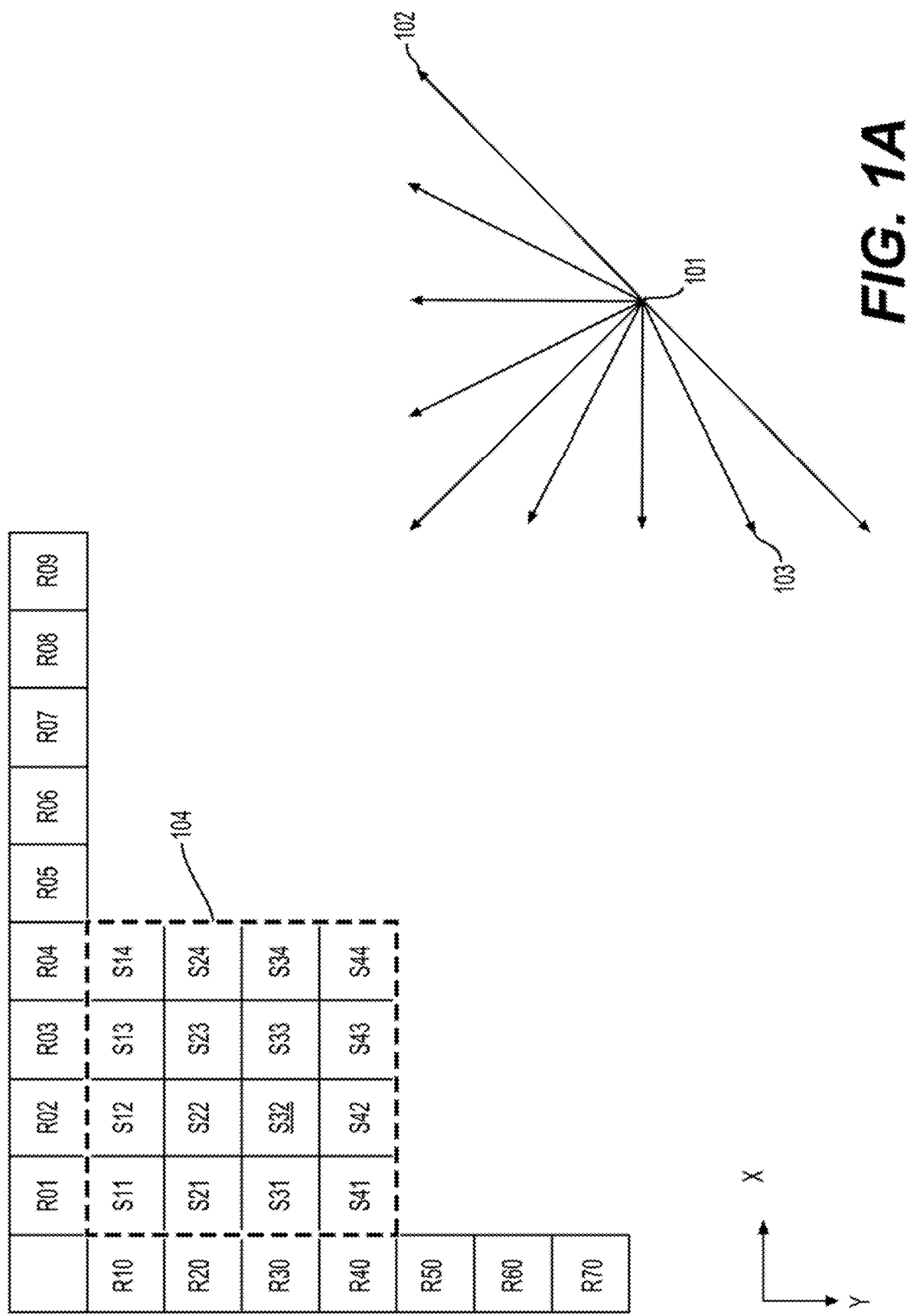
FIG. 1A is a schematic illustration of an exemplary subset of intra prediction modes.
Figure 1B:
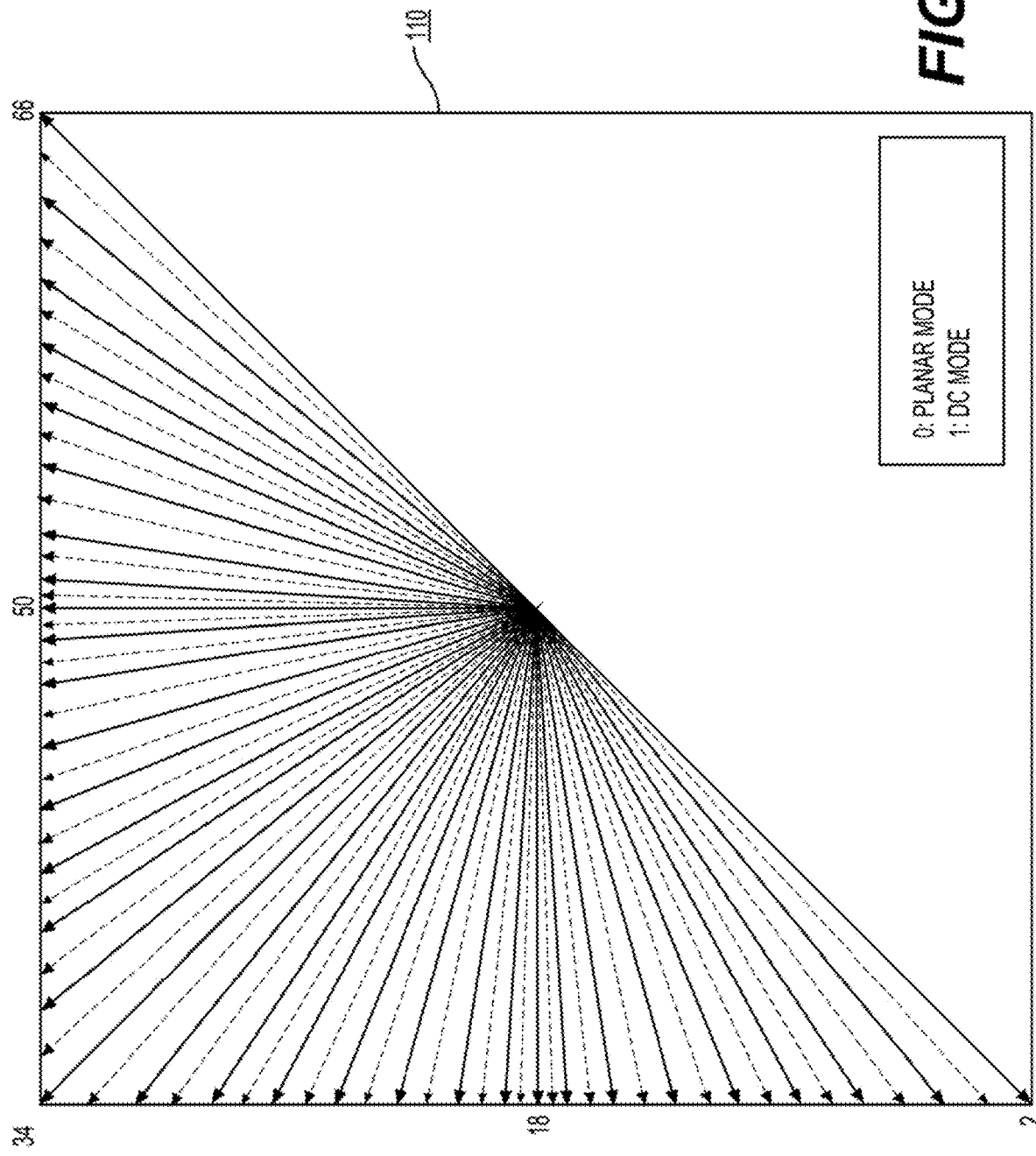
FIG. 1B is an illustration of exemplary intra prediction directions.
Figure 2:
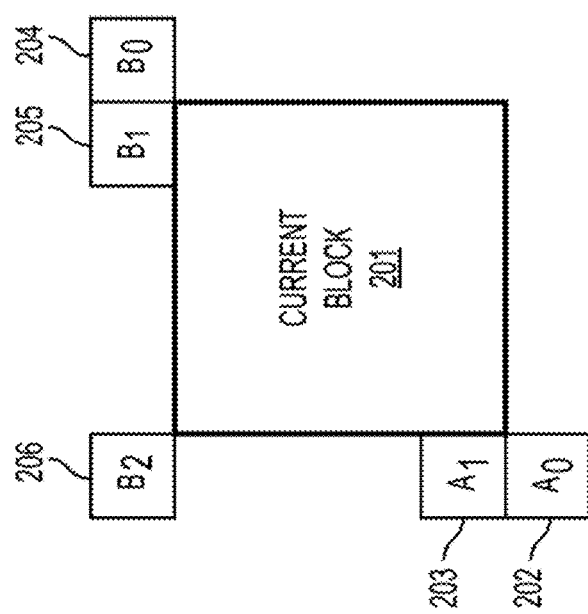
FIG. 2 shows an example of a current block (201) and surrounding samples.
Figure 3:
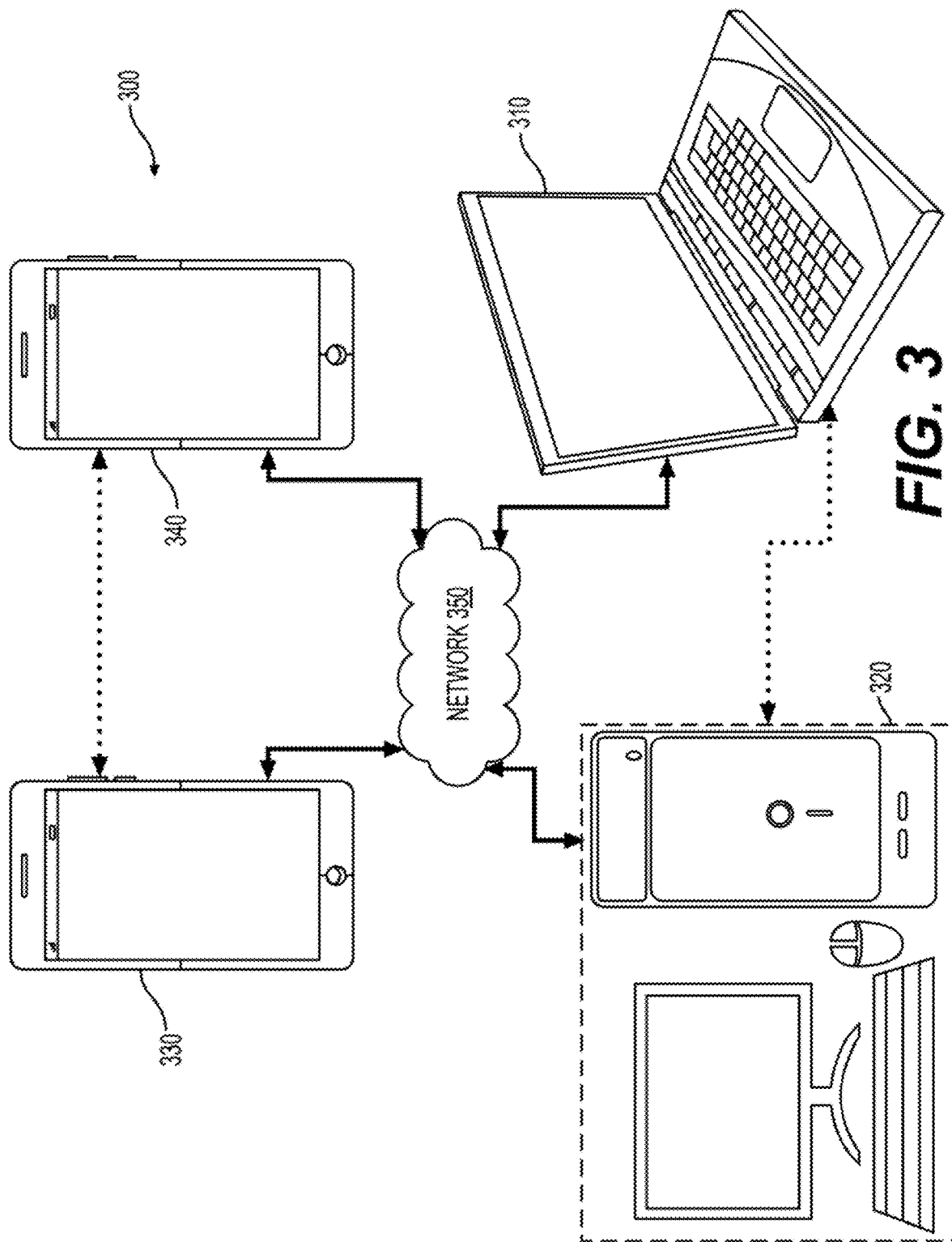
FIG. 3 is a schematic illustration of an exemplary block diagram of a communication system (300).

FIG. 3 illustrates an exemplary block diagram of a communication system (300). The communication system (300) includes a plurality of terminal devices that can communicate with each other, via, for example, a network (350). For example, the communication system (300) includes a first pair of terminal devices (310) and (320) interconnected via the network (350). In the FIG. 3 example, the first pair of terminal devices (310) and (320) performs unidirectional transmission of data. For example, the terminal device (310) may code video data (e.g., a stream of video pictures that are captured by the terminal device (310)) for transmission to the other terminal device (320) via the network (350). The encoded video data can be transmitted in the form of one or more coded video bitstreams. The terminal device (320) may receive the coded video data from the network (350), decode the coded video data to recover the video pictures and display video pictures according to the recovered video data. Unidirectional data transmission may be common in media serving applications and the like.

In another example, the communication system (300) includes a second pair of terminal devices (330) and (340) that perform bidirectional transmission of coded video data, for example, during videoconferencing. For bidirectional transmission of data, in an example, each terminal device of the terminal devices (330) and (340) may code video data (e.g., a stream of video pictures that are captured by the terminal device) for transmission to the other terminal device of the terminal devices (330) and (340) via the network (350). Each terminal device of the terminal devices (330) and (340) also may receive the coded video data transmitted by the other terminal device of the terminal devices (330) and (340), and may decode the coded video data to recover the video pictures and may display video pictures at an accessible display device according to the recovered video data.

In the example of FIG. 3, the terminal devices (310), (320), (330) and (340) are respectively illustrated as servers, personal computers and smart phones but the principles of the present disclosure may be not so limited. Embodiments of the present disclosure find application with laptop computers, tablet computers, media players, and/or dedicated video conferencing equipment. The network (350) represents any number of networks that convey coded video data among the terminal devices (310), (320), (330) and (340), including for example wireline (wired) and/or wireless communication networks. The communication network (350) may exchange data in circuit-switched and/or packet-switched channels. Representative networks include telecommunications networks, local area networks, wide area networks and/or the Internet. For the purposes of the present discussion, the architecture and topology of the network (350) may be immaterial to the operation of the present disclosure unless explained herein below.

Figure 4:
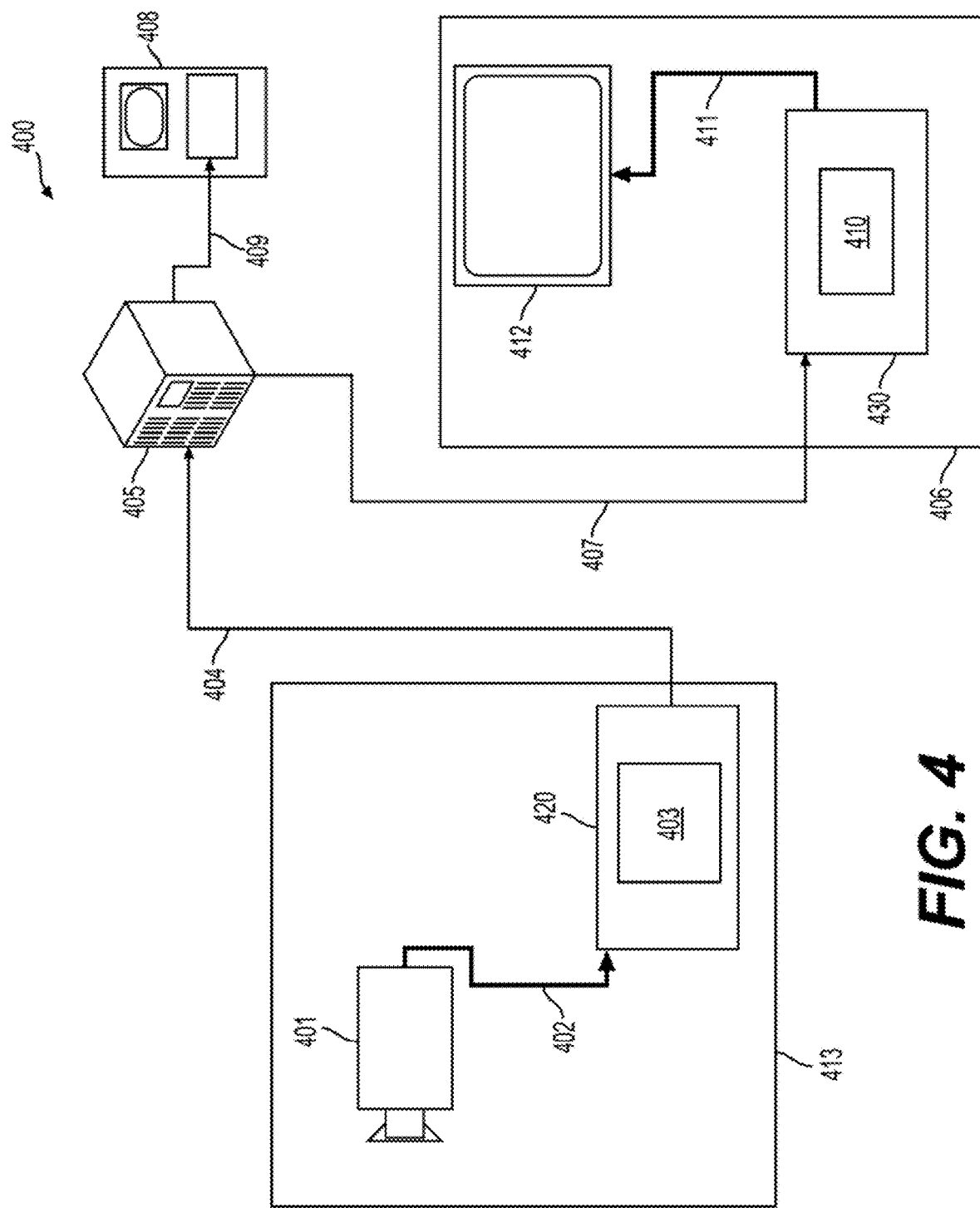
FIG. 4 is a schematic illustration of an exemplary block diagram of a communication system (400).

FIG. 4 illustrates, as an example of an application for the disclosed subject matter, a video encoder and a video decoder in a streaming environment. The disclosed subject matter can be equally applicable to other video enabled applications, including, for example, video conferencing, digital TV, streaming services, storing of compressed video on digital media including CD, DVD, memory stick and the like, and so on.

A streaming system may include a capture subsystem (413), that can include a video source (401), for example a digital camera, creating for example a stream of video pictures (402) that are uncompressed. In an example, the stream of video pictures (402) includes samples that are taken by the digital camera. The stream of video pictures (402), depicted as a bold line to emphasize a high data volume when compared to encoded video data (404) (or coded video bitstreams), can be processed by an electronic device (420) that includes a video encoder (403) coupled to the video source (401). The video encoder (403) can include hardware, software, or a combination thereof to enable or implement aspects of the disclosed subject matter as described in more detail below. The encoded video data (404) (or encoded video bitstream), depicted as a thin line to emphasize the lower data volume when compared to the stream of video pictures (402), can be stored on a streaming server (405) for future use. One or more streaming client subsystems, such as client subsystems (406) and (408) in FIG. 4 can access the streaming server (405) to retrieve copies (407) and (409) of the encoded video data (404). A client subsystem (406) can include a video decoder (410), for example, in an electronic device (430). The video decoder (410) decodes the incoming copy (407) of the encoded video data and creates an outgoing stream of video pictures (411) that can be rendered on a display (412) (e.g., display screen) or other rendering device (not depicted). In some streaming systems, the encoded video data (404), (407), and (409) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (420) and (430) can include other components (not shown). For example, the electronic device (420) can include a video decoder (not shown) and the electronic device (430) can include a video encoder (not shown) as well.

Figure 5:
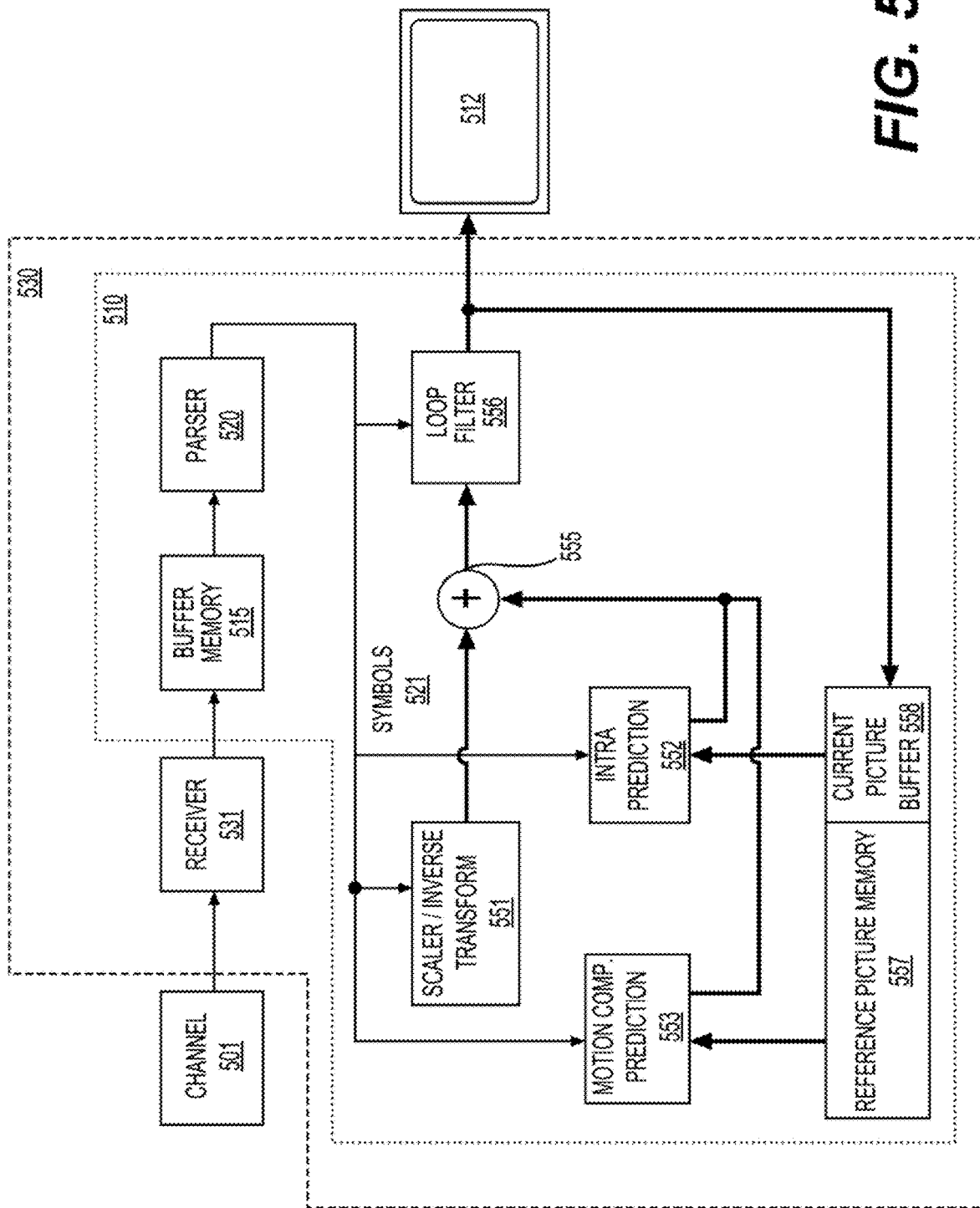
FIG. 5 is a schematic illustration of an exemplary block diagram of a decoder.

FIG. 5 shows an exemplary block diagram of a video decoder (510). The video decoder (510) can be included in an electronic device (530). The electronic device (530) can include a receiver (531) (e.g., receiving circuitry). The video decoder (510) can be used in the place of the video decoder (410) in the FIG. 4 example.

The receiver (531) may receive one or more coded video sequences to be decoded by the video decoder (510). In an embodiment, one coded video sequence is received at a time, where the decoding of each coded video sequence is independent from the decoding of other coded video sequences. The coded video sequence may be received from a channel (501), which may be a hardware/software link to a storage device which stores the encoded video data. The receiver (531) may receive the encoded video data with other data, for example, coded audio data and/or ancillary data streams, that may be forwarded to their respective using entities (not depicted). The receiver (531) may separate the coded video sequence from the other data. To combat network jitter, a buffer memory (515) may be coupled in between the receiver (531) and an entropy decoder/parser (520) ("parser (520)" henceforth). In certain applications, the buffer memory (515) is part of the video decoder (510). In others, it can be outside of the video decoder (510) (not depicted). In still others, there can be a buffer memory (not depicted) outside of the video decoder (510), for example to combat network jitter, and in addition another buffer memory (515) inside the video decoder (510), for example to handle playout timing. When the receiver (531) is receiving data from a store/forward device of sufficient bandwidth and controllability, or from an isosynchronous network, the buffer memory (515) may not be needed, or can be small. For use on best effort packet networks such as the Internet, the buffer memory (515) may be required, can be comparatively large and can be advantageously of adaptive size, and may at least partially be implemented in an operating system or similar elements (not depicted) outside of the video decoder (510).

The video decoder (510) may include the parser (520) to reconstruct symbols (521) from the coded video sequence. Categories of those symbols include information used to manage operation of the video decoder (510), and potentially information to control a rendering device such as a render device (512) (e.g., a display screen) that is not an integral part of the electronic device (530) but can be coupled to the electronic device (530), as shown in FIG. 5. The control information for the rendering device(s) may be in the form of Supplemental Enhancement Information (SEI) messages or Video Usability Information (VUI) parameter set fragments (not depicted). The parser (520) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (520) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (520) may also extract from the coded video sequence information such as transform coefficients, quantizer parameter values, motion vectors, and so forth.

The parser (520) may perform an entropy decoding/parsing operation on the video sequence received from the buffer memory (515), so as to create symbols (521).

Reconstruction of the symbols (521) can involve multiple different units depending on the type of the coded video picture or parts thereof (such as: inter and intra picture, inter and intra block), and other factors. Which units are involved, and how, can be controlled by subgroup control information parsed from the coded video sequence by the parser (520). The flow of such subgroup control information between the parser (520) and the multiple units below is not depicted for clarity.

Beyond the functional blocks already mentioned, the video decoder (510) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (551). The scaler/inverse transform unit (551) receives a quantized transform coefficient as well as control information, including which transform to use, block size, quantization factor, quantization scaling matrices, etc. as symbol(s) (521) from the parser (520). The scaler/inverse transform unit (551) can output blocks comprising sample values, that can be input into aggregator (555).

In some cases, the output samples of the scaler/inverse transform unit (551) can pertain to an intra coded block. The intra coded block is a block that is not using predictive information from previously reconstructed pictures, but can use predictive information from previously reconstructed parts of the current picture. Such predictive information can be provided by an intra picture prediction unit (552). In some cases, the intra picture prediction unit (552) generates a block of the same size and shape of the block under reconstruction, using surrounding already reconstructed information fetched from the current picture buffer (558). The current picture buffer (558) buffers, for example, partly reconstructed current picture and/or fully reconstructed current picture. The aggregator (555), in some cases, adds, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated, block. In such a case, a motion compensation prediction unit (553) can access reference picture memory (557) to fetch samples used for prediction. After motion compensating the fetched samples in accordance with the symbols (521) pertaining to the block, these samples can be added by the aggregator (555) to the output of the scaler/inverse transform unit (551) (in this case called the residual samples or residual signal) so as to generate output sample information. The addresses within the reference picture memory (557) from where the motion compensation prediction unit (553) fetches prediction samples can be controlled by motion vectors, available to the motion compensation prediction unit (553) in the form of symbols (521) that can have, for example X, Y, and reference picture components. Motion compensation also can include interpolation of sample values as fetched from the reference picture memory (557) when sub-sample exact motion vectors are in use, motion vector prediction mechanisms, and so forth.

The output samples of the aggregator (555) can be subject to various loop filtering techniques in the loop filter unit (556). Video compression technologies can include in-loop filter technologies that are controlled by parameters included in the coded video sequence (also referred to as coded video bitstream) and made available to the loop filter unit (556) as symbols (521) from the parser (520). Video compression can also be responsive to meta-information obtained during the decoding of previous (in decoding order) parts of the coded picture or coded video sequence, as well as responsive to previously reconstructed and loop-filtered sample values.

The output of the loop filter unit (556) can be a sample stream that can be output to the render device (512) as well as stored in the reference picture memory (557) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (520)), the current picture buffer (558) can become a part of the reference picture memory (557), and a fresh current picture buffer can be reallocated before commencing the reconstruction of the following coded picture.

The video decoder (510) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (531) may receive additional (redundant) data with the encoded video. The additional data may be included as part of the coded video sequence(s). The additional data may be used by the video decoder (510) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 6:
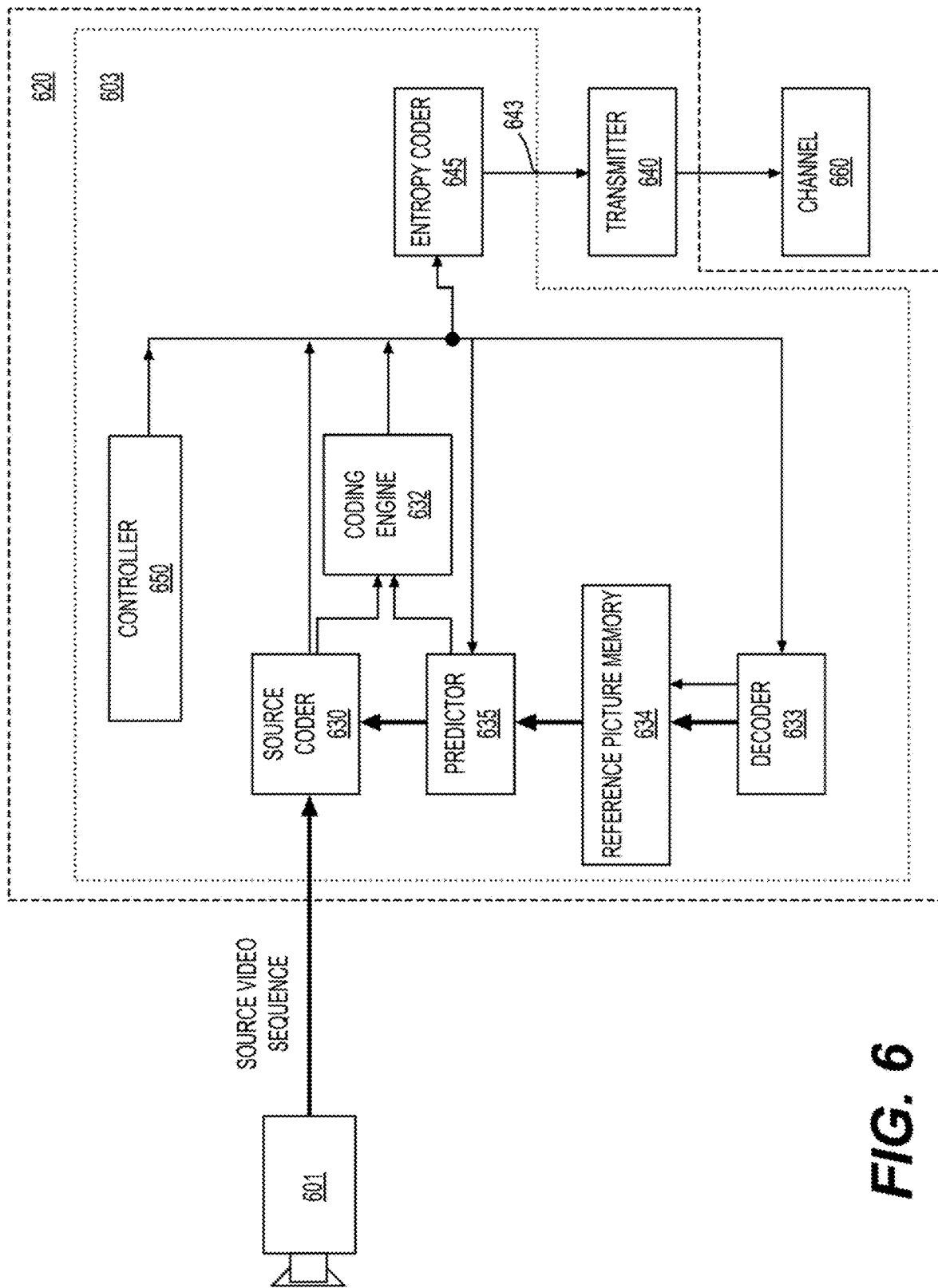
FIG. 6 is a schematic illustration of an exemplary block diagram of an encoder.

FIG. 6 shows an exemplary block diagram of a video encoder (603). The video encoder (603) is included in an electronic device (620). The electronic device (620) includes a transmitter (640) (e.g., transmitting circuitry). The video encoder (603) can be used in the place of the video encoder (403) in the FIG. 4 example.

The video encoder (603) may receive video samples from a video source (601) (that is not part of the electronic device (620) in the FIG. 6 example) that may capture video image(s) to be coded by the video encoder (603). In another example, the video source (601) is a part of the electronic device (620).

The video source (601) may provide the source video sequence to be coded by the video encoder (603) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (601) may be a storage device storing previously prepared video. In a videoconferencing system, the video source (601) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (603) may code and compress the pictures of the source video sequence into a coded video sequence (643) in real time or under any other time constraints as required. Enforcing appropriate coding speed is one function of a controller (650). In some embodiments, the controller (650) controls other functional units as described below and is functionally coupled to the other functional units. The coupling is not depicted for clarity. Parameters set by the controller (650) can include rate control related parameters (picture skip, quantizer, lambda value of rate-distortion optimization techniques, . . . ), picture size, group of pictures (GOP) layout, maximum motion vector search range, and so forth. The controller (650) can be configured to have other suitable functions that pertain to the video encoder (603) optimized for a certain system design.

In some embodiments, the video encoder (603) is configured to operate in a coding loop. As an oversimplified description, in an example, the coding loop can include a source coder (630) (e.g., responsible for creating symbols, such as a symbol stream, based on an input picture to be coded, and a reference picture(s)), and a (local) decoder (633) embedded in the video encoder (603). The decoder (633) reconstructs the symbols to create the sample data in a similar manner as a (remote) decoder also would create. The reconstructed sample stream (sample data) is input to the reference picture memory (634). As the decoding of a symbol stream leads to bit-exact results independent of decoder location (local or remote), the content in the reference picture memory (634) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (633) can be the same as of a "remote" decoder, such as the video decoder (510), which has already been described in detail above in conjunction with FIG. 5. Briefly referring also to FIG. 5, however, as symbols are available and encoding/decoding of symbols to a coded video sequence by an entropy coder (645) and the parser (520) can be lossless, the entropy decoding parts of the video decoder (510), including the buffer memory (515), and parser (520) may not be fully implemented in the local decoder (633).

In an embodiment, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (630) may perform motion compensated predictive coding, which codes an input picture predictively with reference to one or more previously coded picture from the video sequence that were designated as "reference pictures." In this manner, the coding engine (632) codes differences between pixel blocks of an input picture and pixel blocks of reference picture(s) that may be selected as prediction reference(s) to the input picture.

The local video decoder (633) may decode coded video data of pictures that may be designated as reference pictures, based on symbols created by the source coder (630). Operations of the coding engine (632) may advantageously be lossy processes. When the coded video data may be decoded at a video decoder (not shown in FIG. 6), the reconstructed video sequence typically may be a replica of the source video sequence with some errors. The local video decoder (633) replicates decoding processes that may be performed by the video decoder on reference pictures and may cause reconstructed reference pictures to be stored in the reference picture memory (634). In this manner, the video encoder (603) may store copies of reconstructed reference pictures locally that have common content as the reconstructed reference pictures that will be obtained by a far-end video decoder (absent transmission errors).

The predictor (635) may perform prediction searches for the coding engine (632). That is, for a new picture to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the source coder (630), including, for example, setting of parameters and subgroup parameters used for encoding the video data.

Output of all aforementioned functional units may be subjected to entropy coding in the entropy coder (645). The entropy coder (645) translates the symbols as generated by the various functional units into a coded video sequence, by applying lossless compression to the symbols according to technologies such as Huffman coding, variable length coding, arithmetic coding, and so forth.

The transmitter (640) may buffer the coded video sequence(s) as created by the entropy coder (645) to prepare for transmission via a communication channel (660), which may be a hardware/software link to a storage device which would store the encoded video data. The transmitter (640) may merge coded video data from the video encoder (603) with other data to be transmitted, for example, coded audio data and/or ancillary data streams (sources not shown).

The controller (650) may manage operation of the video encoder (603). During coding, the controller (650) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (603) may perform coding operations according to a predetermined video coding technology or standard, such as ITU-T Rec. H.265. In its operation, the video encoder (603) may perform various compression operations, including predictive coding operations that exploit temporal and spatial redundancies in the input video sequence. The coded video data, therefore, may conform to a syntax specified by the video coding technology or standard being used.

In an embodiment, the transmitter (640) may transmit additional data with the encoded video. The source coder (630) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions, are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 7:
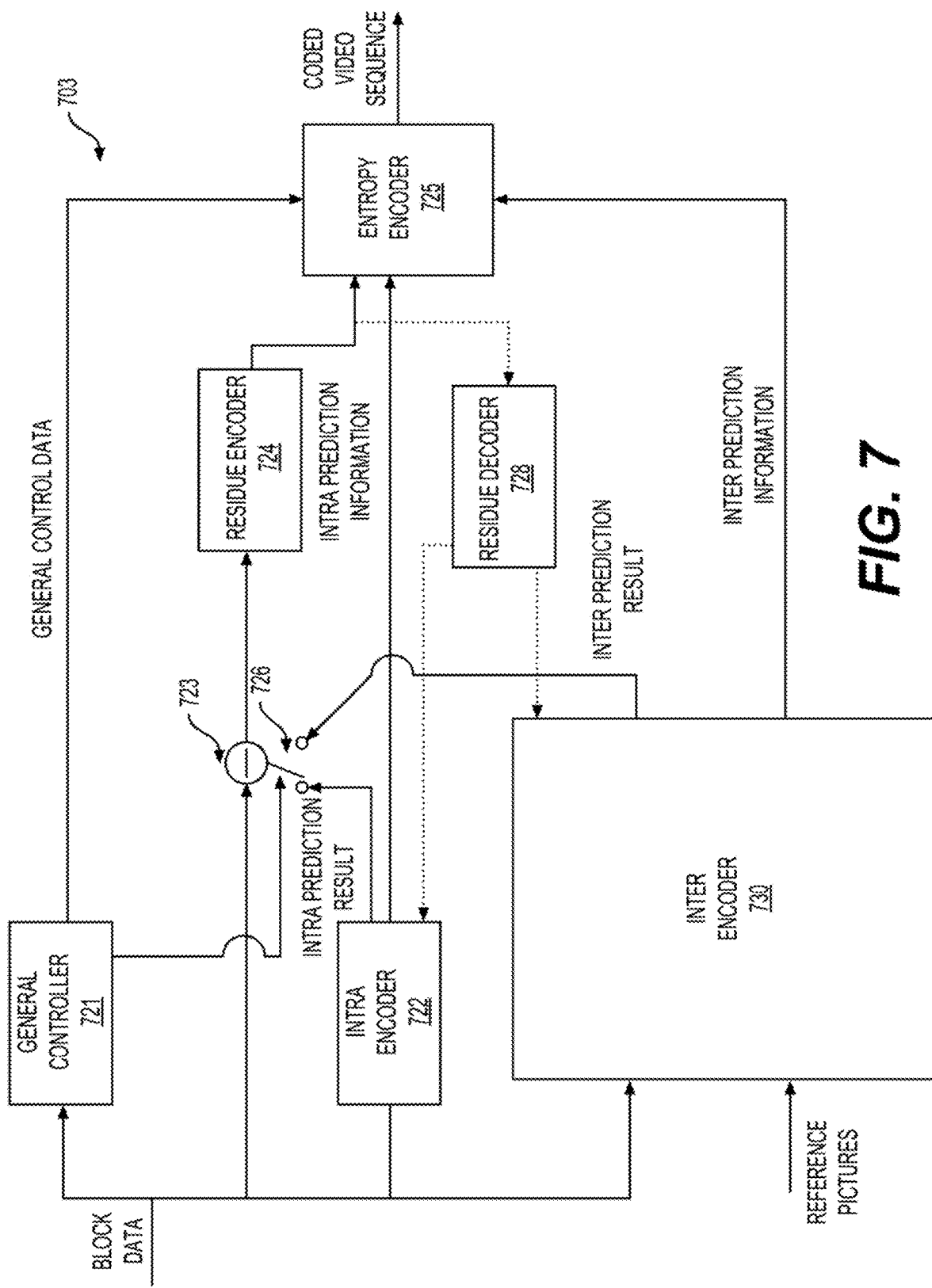
FIG. 7 shows a block diagram of an exemplary encoder.

FIG. 7 shows an exemplary diagram of a video encoder (703). The video encoder (703) is configured to receive a processing block (e.g., a prediction block) of sample values within a current video picture in a sequence of video pictures, and encode the processing block into a coded picture that is part of a coded video sequence. In an example, the video encoder (703) is used in the place of the video encoder (403) in the FIG. 4 example.

In an HEVC example, the video encoder (703) receives a matrix of sample values for a processing block, such as a prediction block of 8×8 samples, and the like. The video encoder (703) determines whether the processing block is best coded using intra mode, inter mode, or bi-prediction mode using, for example, rate-distortion optimization. When the processing block is to be coded in intra mode, the video encoder (703) may use an intra prediction technique to encode the processing block into the coded picture; and when the processing block is to be coded in inter mode or bi-prediction mode, the video encoder (703) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (703) includes other components, such as a mode decision module (not shown) to determine the mode of the processing blocks.

In the FIG. 7 example, the video encoder (703) includes an inter encoder (730), an intra encoder (722), a residue calculator (723), a switch (726), a residue encoder (724), a general controller (721), and an entropy encoder (725) coupled together as shown in FIG. 7.

The inter encoder (730) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (722) is configured to receive the samples of the current block (e.g., a processing block), in some cases compare the block to blocks already coded in the same picture, generate quantized coefficients after transform, and in some cases also generate intra prediction information (e.g., an intra prediction direction information according to one or more intra encoding techniques). In an example, the intra encoder (722) also calculates intra prediction results (e.g., predicted block) based on the intra prediction information and reference blocks in the same picture.

The general controller (721) is configured to determine general control data and control other components of the video encoder (703) based on the general control data. In an example, the general controller (721) determines the mode of the block, and provides a control signal to the switch (726) based on the mode. For example, when the mode is the intra mode, the general controller (721) controls the switch (726) to select the intra mode result for use by the residue calculator (723), and controls the entropy encoder (725) to select the intra prediction information and include the intra prediction information in the bitstream; and when the mode is the inter mode, the general controller (721) controls the switch (726) to select the inter prediction result for use by the residue calculator (723), and controls the entropy encoder (725) to select the inter prediction information and include the inter prediction information in the bitstream.

The residue calculator (723) is configured to calculate a difference (residue data) between the received block and prediction results selected from the intra encoder (722) or the inter encoder (730). The residue encoder (724) is configured to operate based on the residue data to encode the residue data to generate the transform coefficients. In an example, the residue encoder (724) is configured to convert the residue data from a spatial domain to a frequency domain, and generate the transform coefficients. The transform coefficients are then subject to quantization processing to obtain quantized transform coefficients. In various embodiments, the video encoder (703) also includes a residue decoder (728). The residue decoder (728) is configured to perform inverse-transform, and generate the decoded residue data. The decoded residue data can be suitably used by the intra encoder (722) and the inter encoder (730). For example, the inter encoder (730) can generate decoded blocks based on the decoded residue data and inter prediction information, and the intra encoder (722) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (725) is configured to format the bitstream to include the encoded block. The entropy encoder (725) is configured to include various information in the bitstream according to a suitable standard, such as the HEVC standard. In an example, the entropy encoder (725) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 8:
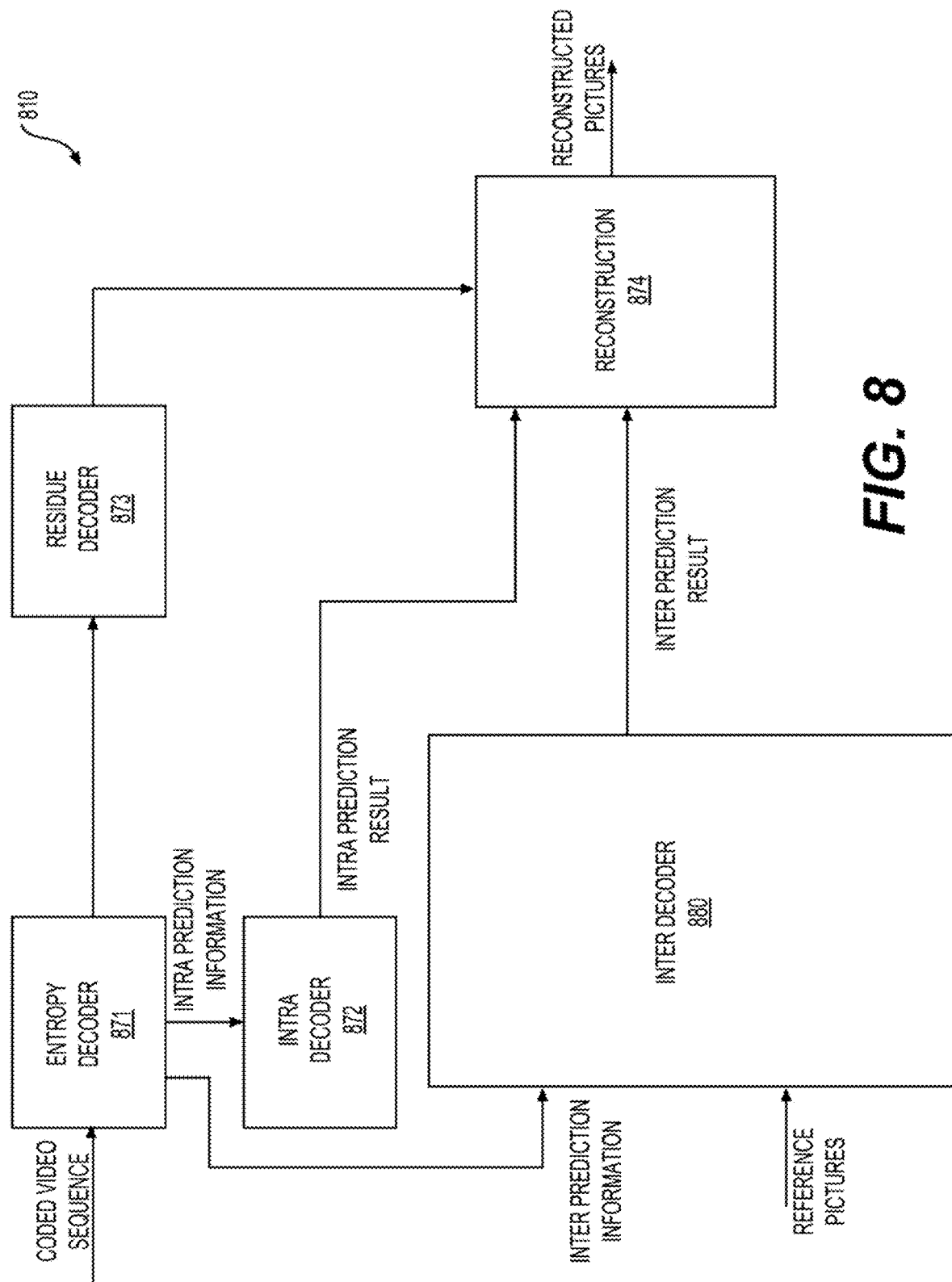
FIG. 8 shows a block diagram of an exemplary decoder.

FIG. 8 shows an exemplary diagram of a video decoder (810). The video decoder (810) is configured to receive coded pictures that are part of a coded video sequence, and decode the coded pictures to generate reconstructed pictures. In an example, the video decoder (810) is used in the place of the video decoder (410) in the FIG. 4 example.

In the FIG. 8 example, the video decoder (810) includes an entropy decoder (871), an inter decoder (880), a residue decoder (873), a reconstruction module (874), and an intra decoder (872) coupled together as shown in FIG. 8.

The entropy decoder (871) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode) and prediction information (such as, for example, intra prediction information or inter prediction information) that can identify certain sample or metadata that is used for prediction by the intra decoder (872) or the inter decoder (880), respectively. The symbols can also include residual information in the form of, for example, quantized transform coefficients, and the like. In an example, when the prediction mode is inter or bi-predicted mode, the inter prediction information is provided to the inter decoder (880); and when the prediction type is the intra prediction type, the intra prediction information is provided to the intra decoder (872). The residual information can be subject to inverse quantization and is provided to the residue decoder (873).

The inter decoder (880) is configured to receive the inter prediction information, and generate inter prediction results based on the inter prediction information.

The intra decoder (872) is configured to receive the intra prediction information, and generate prediction results based on the intra prediction information.

The residue decoder (873) is configured to perform inverse quantization to extract de-quantized transform coefficients, and process the de-quantized transform coefficients to convert the residual information from the frequency domain to the spatial domain. The residue decoder (873) may also require certain control information (to include the Quantizer Parameter (QP)), and that information may be provided by the entropy decoder (871) (data path not depicted as this may be low volume control information only).

The reconstruction module (874) is configured to combine, in the spatial domain, the residual information as output by the residue decoder (873) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (403), (603), and (703), and the video decoders (410), (510), and (810) can be implemented using any suitable technique. In an embodiment, the video encoders (403), (603), and (703), and the video decoders (410), (510), and (810) can be implemented using one or more integrated circuits. In another embodiment, the video encoders (403), (603), and (603), and the video decoders (410), (510), and (810) can be implemented using one or more processors that execute software instructions.

Various inter prediction modes can be used in VVC. For an inter-predicted CU, motion parameters can include MV(s), one or more reference picture indices, a reference picture list usage index, and additional information for certain coding features to be used for inter-predicted sample generation. A motion parameter can be signaled explicitly or implicitly. When a CU is coded with a skip mode, the CU can be associated with a PU and can have no significant residual coefficients, no coded motion vector delta or MV difference (e.g., MVD) or a reference picture index. A merge mode can be specified where the motion parameters for the current CU are obtained from neighboring CU(s), including spatial and/or temporal candidates, and optionally additional information such as introduced in VVC. The merge mode can be applied to an inter-predicted CU, not only for skip mode. In an example, an alternative to the merge mode is the explicit transmission of motion parameters, where MV(s), a corresponding reference picture index for each reference picture list and a reference picture list usage flag and other information are signaled explicitly per CU.

In an embodiment, such as in VVC, VVC Test model (VTM) reference software includes one or more refined inter prediction coding tools that include: an extended merge prediction, a merge motion vector difference (MMVD) mode, an adaptive motion vector prediction (AMVP) mode with symmetric MVD signaling, an affine motion compensated prediction, a subblock-based temporal motion vector prediction (SbTMVP), an adaptive motion vector resolution (AMVR), a motion field storage (1/16th luma sample MV storage and 8×8 motion field compression), a bi-prediction with CU-level weights (BCW), a bi-directional optical flow (BDOF), a prediction refinement using optical flow (PROF), a decoder side motion vector refinement (DMVR), a combined inter and intra prediction (CIIP), a geometric partitioning mode (GPM), and the like. Inter predictions and related methods are described in details below.

Extended merge prediction can be used in some examples. In an example, such as in VTM4, a merge candidate list is constructed by including the following five types of candidates in order: spatial motion vector predictor(s) (MVP(s)) from spatial neighboring CU(s), temporal MVP(s) from collocated CU(s), history-based MVP(s) from a first-in-first-out (FIFO) table, pairwise average MVP(s), and zero MV(s).

A size of the merge candidate list can be signaled in a slice header. In an example, the maximum allowed size of the merge candidate list is 6 in VTM4. For each CU coded in the merge mode, an index (e.g., a merge index) of a best merge candidate can be encoded using truncated unary binarization (TU). The first bin of the merge index can be coded with context (e.g., context-adaptive binary arithmetic coding (CABAC)) and a bypass coding can be used for other bins.

Figure 9:
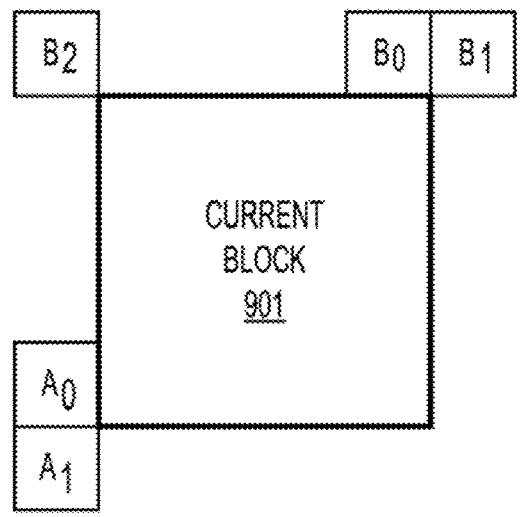
FIG. 9 shows positions of spatial merge candidates according to an embodiment of the disclosure.

Some examples of a generation process of each category of merge candidates are provided below. In an embodiment, spatial candidate(s) are derived as follows. The derivation of spatial merge candidates in VVC can be identical to that in HEVC. In an example, a maximum of four merge candidates are selected among candidates located in positions depicted in FIG. 9. FIG. 9 shows positions of spatial merge candidates according to an embodiment of the disclosure. Referring to FIG. 9, an order of derivation is B1, A1, B0, A0, and B2. The position B2 is considered only when any CU of positions A0, B0, B1, and A1 is not available (e.g., because the CU belongs to another slice or another tile) or is intra coded.

After a candidate at the position A1 is added, the addition of the remaining candidates is subject to a redundancy check which ensures that candidates with same motion information are excluded from the candidate list so that coding efficiency is improved.

Figure 10:
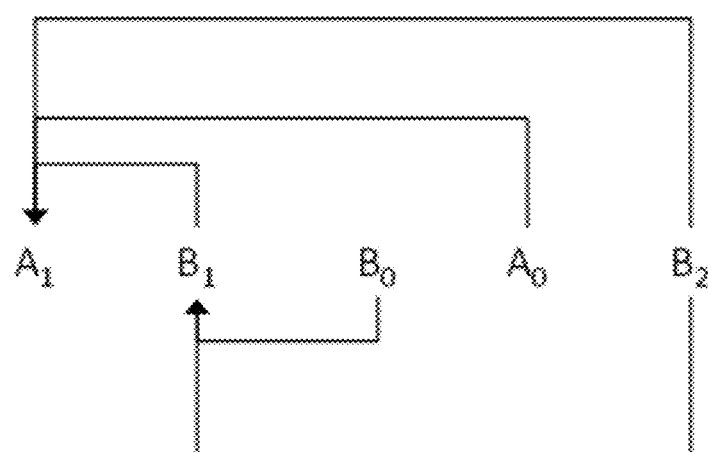
FIG. 10 shows candidate pairs that are considered for a redundancy check of spatial merge candidates according to an embodiment of the disclosure.

To reduce computational complexity, not all possible candidate pairs are considered in the mentioned redundancy check. Instead, only pairs linked with an arrow in FIG. 10 are considered and a candidate is only added to the candidate list if the corresponding candidate used for the redundancy check does not have the same motion information. FIG. 10 shows candidate pairs that are considered for a redundancy check of spatial merge candidates according to an embodiment of the disclosure. Referring to FIG. 10, the pairs linked with respective arrows include A1 and B1, A1 and A0, A1 and B2, B1 and B0, and B1 and B2. Thus, candidates at the positions B1, A0, and/or B2 can be compared with the candidate at the position A1, and candidates at the positions B0 and/or B2 can be compared with the candidate at the position B1.

Figure 11:
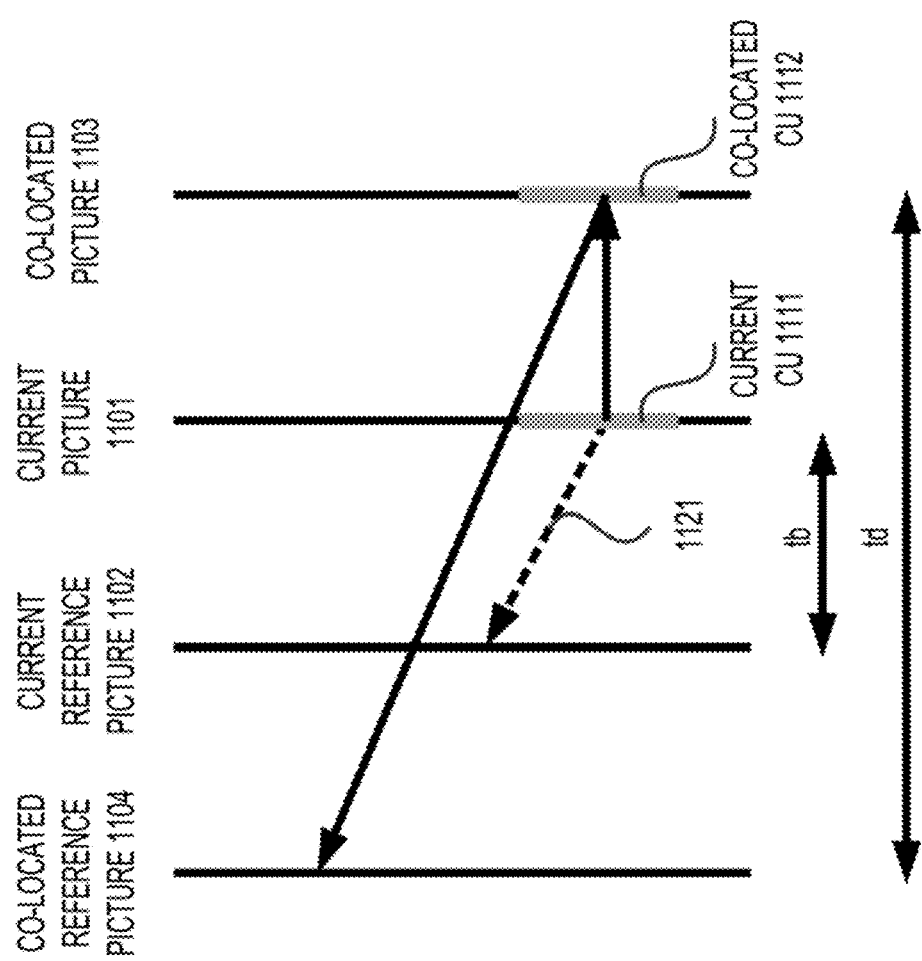
FIG. 11 shows exemplary motion vector scaling for a temporal merge candidate.

In an embodiment, temporal candidate(s) are derived as follows. In an example, only one temporal merge candidate is added to the candidate list. FIG. 11 shows exemplary motion vector scaling for a temporal merge candidate. To derive the temporal merge candidate of a current CU (1111) in a current picture (1101), a scaled MV (1121) (e.g., shown by a dotted line in FIG. 11) can be derived based on a co-located CU (1112) belonging to a collocated reference picture (1104). A reference picture list used to derive the co-located CU (1112) can be explicitly signaled in a slice header. The scaled MV (1121) for the temporal merge candidate can be obtained as shown by the dotted line in FIG. 11. The scaled MV (1121) can be scaled from the MV of the co-located CU (1112) using picture order count (POC) distances tb and td. The POC distance tb can be defined to be the POC difference between a current reference picture (1102) of the current picture (1101) and the current picture (1101). The POC distance td can be defined to be the POC difference between the collocated reference picture (1104) of the collocated picture (1103) and the collocated picture (1103). A reference picture index of the temporal merge candidate can be set to zero.

Figure 12:
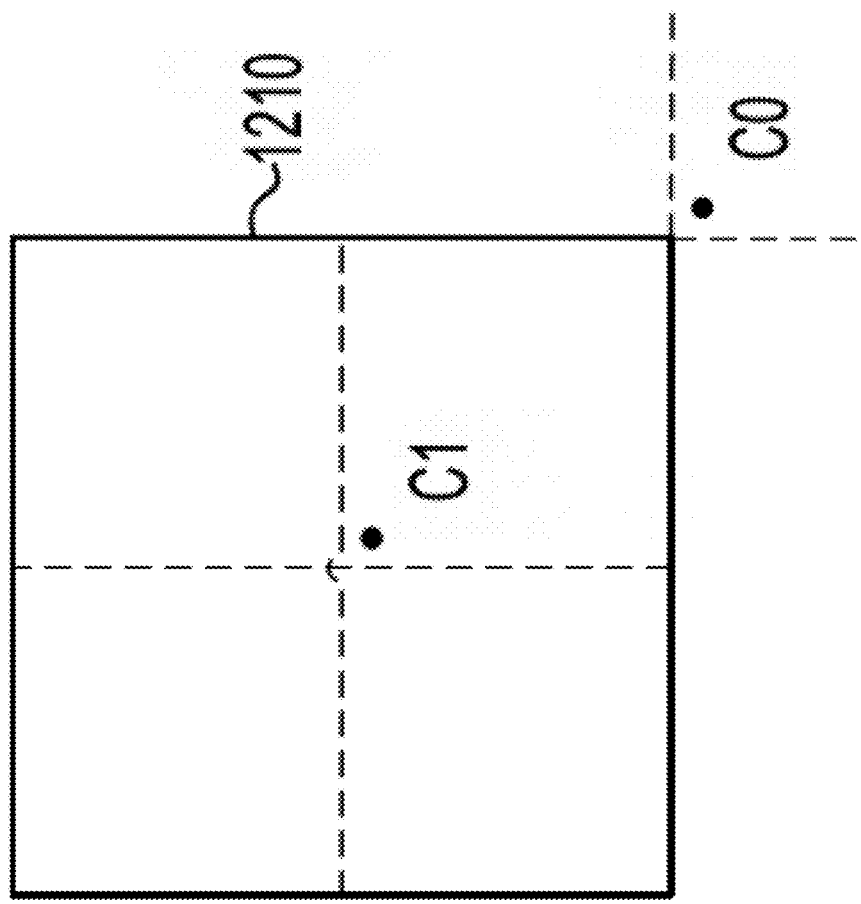
FIG. 12 shows exemplary candidate positions for a temporal merge candidate of a current coding unit.

FIG. 12 shows exemplary candidate positions (e.g., C0 and C1) for a temporal merge candidate of a current CU. A position for the temporal merge candidate can be selected between the candidate positions C0 and C1. The candidate position C0 is located at a bottom-right corner of a collocated CU (1210) of the current CU. The candidate position C1 is located at a center of the collocated CU (1210) of the current CU. If a CU at the candidate position C0 is not available, is intra coded, or is outside of a current row of CTUs, the candidate position C1 is used to derive the temporal merge candidate. Otherwise, for example, the CU at the candidate position C0 is available, intra coded, and in the current row of CTUs, the candidate position C0 is used to derive the temporal merge candidate.

A template matching (TM) technique can be used in video/image coding. To further improve the compression efficiency of VVC standard, for example, TM can be used to refine an MV. In an example, the TM is used at a decoder side. With the TM mode, an MV can be refined by constructing a template (e.g., a current template) of a block (e.g., a current block) in a current picture and determine the closest matching between the template of the block in the current picture and a plurality of possible templates (e.g., a plurality of possible reference templates) in a reference picture. In an embodiment, the template of the block in the current picture can include left neighboring reconstructed samples of the block and above neighboring reconstructed samples of the block. The TM can be used in video/image coding beyond VVC.

Figure 13:
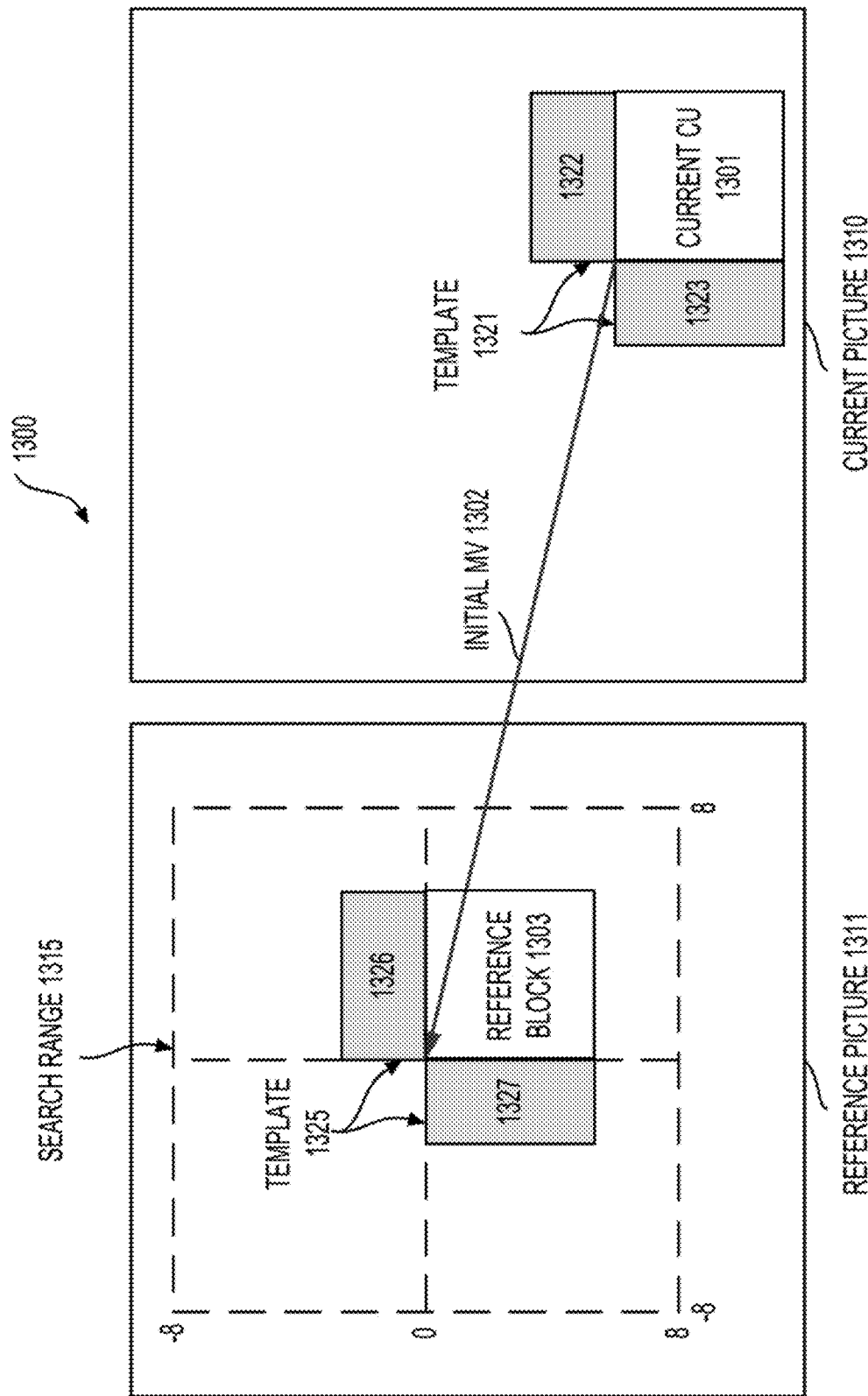
FIG. 13 shows an example of template matching (1300).

FIG. 13 shows an example of template matching (1300). The TM can be used to derive motion information (e.g., deriving final motion information from initial motion information, such as an initial MV 1302) of a current CU (1301) by determining the closest match between a template (1321) of the current CU (1301) in a current picture (1310) and a template of a plurality of possible templates (e.g., one of the plurality of possible templates being a template (1325)) in a reference picture (1311). The template (1321) of the current CU (1301) can have any suitable shape and any suitable size.

In an embodiment, the template (1321) of the current CU (1301) includes a top template (1322) and a left template (1323). Each of the top template (1322) and the left template (1323) can have any suitable shape and any suitable size.

The top template (1322) can include samples in one or more top neighboring blocks of the current CU (1301). In an example, the top template (1322) includes four rows of samples in one or more top neighboring blocks of the current CU (1301). The left template (1323) can include samples in one or more left neighboring blocks of the current CU (1301). In an example, the left template (1323) includes four columns of samples in the one or more left neighboring blocks of the current CU (1301).

Each one (e.g., the template (1325)) of the plurality of possible templates in the reference picture (1311) corresponds to the template (1321) in the current picture (1310). In an embodiment, the initial MV (1302) points from the current CU (1301) to a reference block (1303) in the reference picture (1311). Each one (e.g., the template (1325)) of the plurality of possible templates in the reference picture (1311) and the template (1321) in the current picture (1310) can have an identical shape and an identical size. For example, the template (1325) of the reference block (1303) includes a top template (1326) in the reference picture (1311) and a left template (1327) in the reference picture (1311). The top template (1326) can include samples in one or more top neighboring blocks of the reference block (1303). The left template (1327) can include samples in one or more left neighboring blocks of the reference block (1303).

A TM cost can be determined based on a pair of templates, such as the template (1321) and the template (1325). The TM cost can indicate matching between the template (1321) and the template (1325). An optimized MV (or a final MV) can be determined based on a search around the initial MV (1302) of the current CU (1301) within a search range (1315). The search range (1315) can have any suitable shape and any suitable number of reference samples. In an example, the search range (1315) in the reference picture (1311) includes a [−L, L]-pel range where L is a positive integer, such as 8 (e.g., 8 samples). For example, a difference (e.g., [0, 1]) is determined based on the search range (1315), and an intermediate MV is determined by a summation of the initial MV (1302) and the difference (e.g., [0, 1]). An intermediate reference block and a corresponding template in the reference picture (1311) can be determined based on the intermediate MV. A TM cost can be determined based on the template (1321) and the intermediate template in the reference picture (1311). The TM costs can correspond to the differences (e.g., [0, 0] corresponding to the initial MV (1302), [0, 1], and the like) that are determined based on the search range (1315). In an example, the difference corresponding to the smallest TM cost is selected, and the optimized MV is the summation of the difference corresponding to the smallest TM cost and the initial MV (1302). As described above, the TM can derive the final motion information (e.g., the optimized MV) from the initial motion information (e.g., the initial MV 1302).

Figure 14:
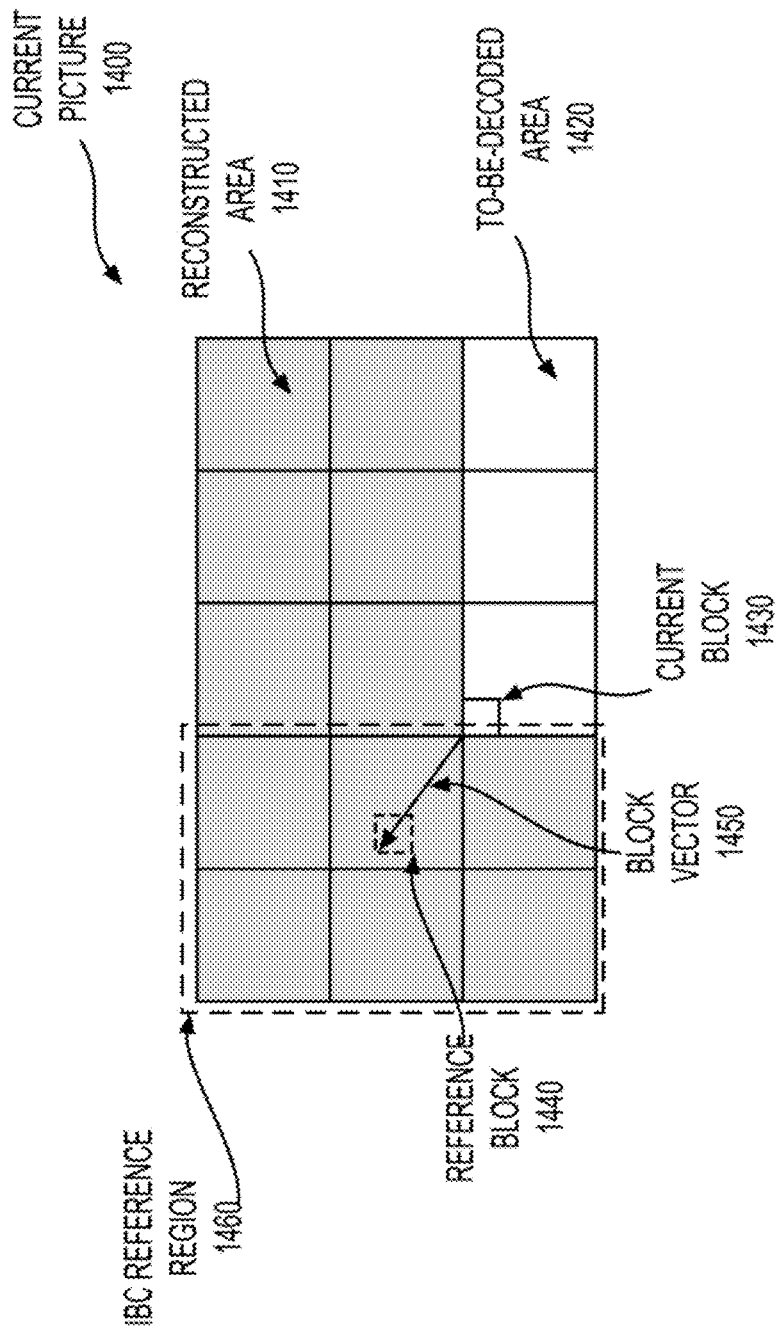
FIG. 14 shows an example of intra block copy (IBC) according to an embodiment of the disclosure.

FIG. 14 shows an example of intra block copy (IBC or IntraBC) according to an embodiment of the disclosure. A current picture (1400) to be reconstructed includes a reconstructed area (1410) (gray area) and a to-be-decoded area (1420) (white area). A current block (1430) is under reconstruction by a decoder. The current block (1430) can be reconstructed from a reference block (1440) that is in the reconstructed area (1410). A position offset between the reference block (1440) and the current block (1430) may be referred to as a block vector (1450) (or BV (1450)). In the FIG. 14 example, an IBC reference region (1460) is within the reconstructed area (1410), the reference block (1440) is within the IBC reference region (1460), and the block vector (1450) points to the reference block (1440) within the IBC reference region (1460).

Various constraints can be applied to a BV and/or an IBC reference region.

In an embodiment, an effective memory requirement to store reference samples to be used in intra block copy is one CTU size (e.g., a CTB size). In an example, the CTU size is 128×128 samples. A current CTU includes a current region under reconstruction. The current region has a size of 64×64 samples. Since a reference memory can also store reconstructed samples in the current region, the reference memory can store 3 more regions of 64×64 samples when a reference memory size is equal to the CTU size of 128×128 samples. Accordingly, an IBC reference region can include certain parts of a previously reconstructed CTU while a total memory requirement for storing reference samples is unchanged (e.g., 1 CTU size of 128×128 samples or 4 64×64 reference samples in total). In an example, the previously reconstructed CTU is a left neighbor of the current CTU.

In some examples, such as in HEVC, additional memory in DPB is used and the hardware implementation may employ external memory. The additional external memory access can increase memory bandwidth and thus implementation cost.

As described above, to reduce the implementation cost, the entire reconstructed area (1410) that is already reconstructed is not used as the IBC reference region. The IBC reference region may be constrained to be within a smaller area, such as the IBC reference region (1460). The search range or the IBC reference region (1460) may be limited for memory purposes.

In an embodiment, such as in VVC, a fixed memory is used in the IBC mode (or the IntraBC mode). Accordingly, the IBC can be implemented by using on-chip memory to significantly decrease the memory bandwidth requirement and hardware complexity. A reference sample memory (RSM) can be used to store samples of a single CTU, and a size of the RSM is the single CTU. One feature of the RSM is a continuous update mechanism in which reconstructed samples of a left neighboring CTU can be replaced with reconstructed samples of a current CTU.

A BV coding of the IBC mode can employ methods of a merge list for inter prediction. A BV can be coded either explicitly or implicitly. In the explicit mode, a BV difference (BVD) between a BV and a BV predictor (BVP) can be signaled. The BVD coding can use an MVD coding process used in the AMVP mode that is used in inter prediction and result in a final BV (e.g., a vector sum of the BV predictor and the BVD). In an example, if the reconstructed BV points to an area outside of the reference sample area, a correction is performed where an absolute offset for each direction is removed using a modulo operation with a width and a height of the RSM. The explicit mode can be referred to as an IBC regular mode, or IBC AMVP mode in some examples. In the implicit mode, the BV can be recovered from a BVP without using a BVD, in a similar way as the coding of an MV in the merge mode that is used in inter prediction. The implicit mode can be referred to as an IBC merge mode, in some examples.

When the IBC mode is used, an IBC candidate list including BVP candidates can be constructed. The IBC candidate list can be an IBC merge candidate list when the IBC merge mode is used. The IBC candidate list can be an IBC AMVP candidate list (or an IBC BV predictor list) when the IBC AMVP mode is used. Candidate derivation in the IBC merge candidate list or the IBC AMVP candidate list may follow the same logic as a merge candidate list used in the regular merge mode (used in inter prediction) or an AMVP candidate list used in the regular AMVP mode (used in inter prediction), respectively.

In constructing an IBC candidate list of a current block to be coded with the IBC mode, BVs of spatial neighbors (e.g., two spatial neighbors) of the current block and history-based BV predictors (HBVPs) (e.g., five HBVPs) of the current block can be checked and included in the IBC candidate list. The BVs of spatial neighbors of the current block can be referred to as spatial candidate(s). The HBVPs of the current block can be referred to as HBVP candidates. The HBVP candidates can include BVs of reconstructed blocks (e.g., blocks that may not be adjacent to the current block) in a current picture that includes the current block. In an example, only the first HBVP is compared with spatial candidates when added to the IBC candidate list. In an example, the IBC candidate list of the current block includes a temporal candidate determined based on a BV of a temporal neighbor of the current block.

In some examples, the IBC merge candidate list can include BVP candidate(s) that are spatial candidate(s), temporal candidate(s), HBVP candidate(s), and pairwise candidate(s). A pairwise candidate can be determined based on two existing BVP candidates in the IBC merge candidate list. The IBC merge candidate list may include up to six BVP candidates. The IBC AMVP candidate list may include the first two BVP candidates that may be used in the IBC merge candidate list.

In an example, an IBC candidate list in the IBC mode is for both cases, such as the IBC merge mode and the IBC AMVP mode. For example, the IBC merge mode may use up to six candidates of the IBC candidate list. The regular IBC mode may use only the first two candidates of the IBC candidate list.

Figure 15:
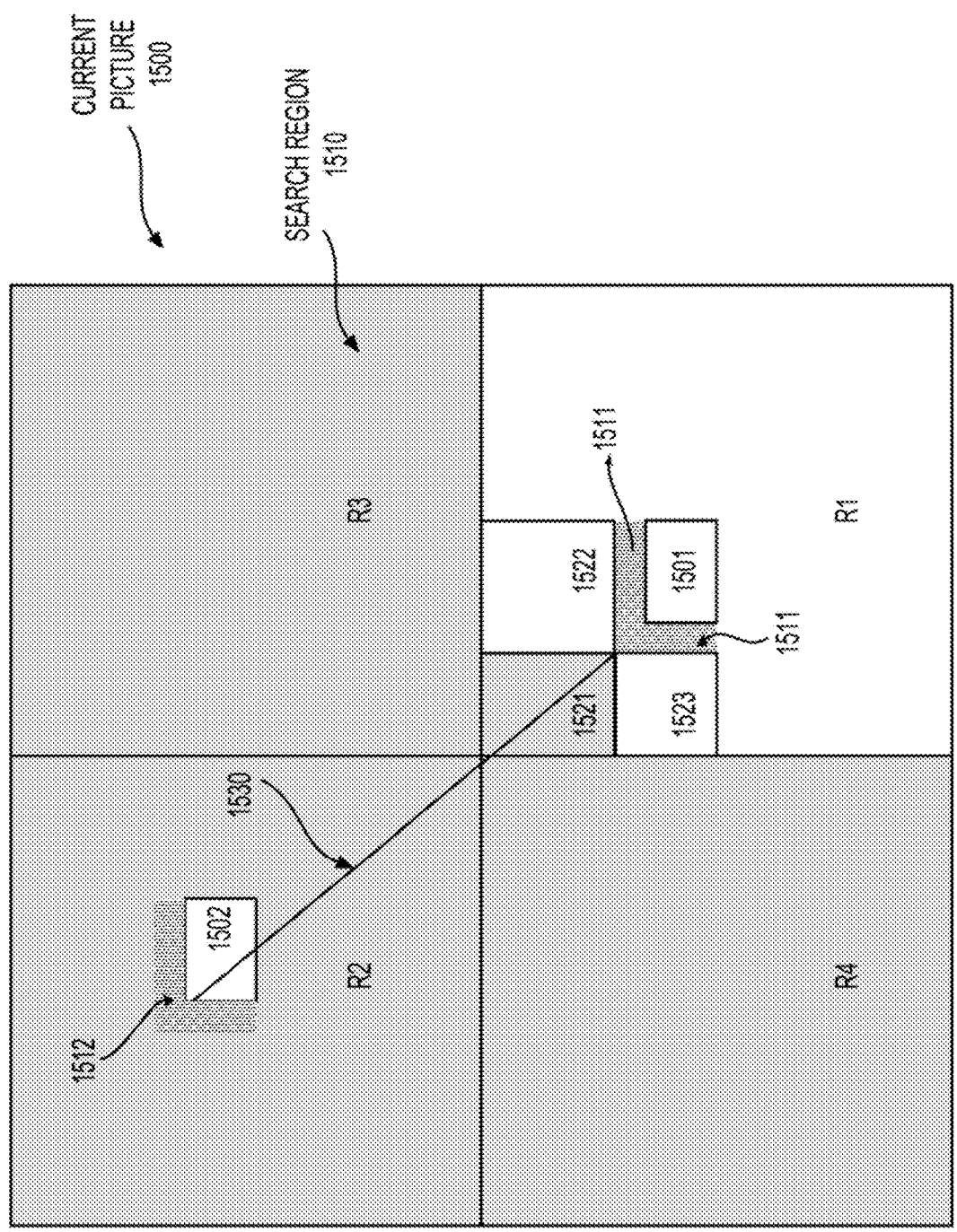
FIG. 15 shows an example of an intra template-matching prediction (IntraTMP) mode applied to a current block.

FIG. 15 shows an example of an intra template-matching prediction (IntraTMP) mode applied to a current block (1501) in a current picture (or a current frame) (1500). The IntraTMP mode can be used in video/image coding, such as in ECMS. In FIG. 15, the current picture (1500) includes CTUs R1-R4.

The CTU R1 is a current CTU that is under reconstruction. The CTUs R2-R4 corresponding to a top-left CTU of the current CTU R1, an above CTU of the current CTU R1, and a left CTU of the current CTU R1 are already reconstructed. A top-left area of R1 includes regions (1521)-(1523), the current block (1501), and a current template (1511) of the current block (1501). The current template (1511) can include neighboring samples of the current block (1501) and are already reconstructed. In the example shown in FIG. 15, the current template (1511) is L-shaped. The current template can have another shape and can include any suitable number of samples. The region (1521) is already reconstructed. In an example, the regions (1522)-(1523) are already reconstructed.

To code (e.g., to reconstruct) the current block (1501), templates that are already reconstructed in a search area (gray area) (1510) can be checked. The search area (1510) can include R2-R4 and the region (1521). The regions (1522)-(1523) are not included in the search area (1510). The current template (1511) of the current block (1501) can be compared with each respective template in the search area (1510). The templates in the search area (1510) can have an identical shape as the current template (1511). A template matching (TM) cost can be determined based on the current template (1511) and the respective template in the search area (1510). The TM cost can be determined based on a sum of absolute difference (SAD) between the current template (1511) and the respective template. Other functions, such as sum of squared errors (SSE), a variance, a partial SAD, or the like can also be used to determine the TM costs.

A prediction block (1502) is determined based on the TM costs. In an example, the prediction block (1502) corresponds to the least TM cost in the determined TM costs. The prediction block (1502) can be referred to as the best prediction block where a template (also referred to as a reference template) (1512) of the prediction block (1502) is matched to the current template (1511). A block vector $BV_{IntraTMP}$ (also referred to as an IntraTMP-based block vector) (1530) can indicate a position displacement between the reference template (1512) and the current template (1511)). In an example, a position displacement between the prediction block (1502) and the current block (1501)) is identical to the position displacement between the reference template (1512) and the current template (1511)). The block vector $BV_{IntraTMP}$ (1530) can indicate the position displacement between the prediction block (1502) and the current block (1501)).

The IntraTMP mode is an intra prediction mode that copies the prediction block (1502) from a reconstructed part of the current picture (1500). In an example, the reference template (1512) of the prediction block (1502) matches the current template (1511). For a predefined search range, an encoder can search for the most similar template (e.g., the reference template (1512)) to the current template (1511) in the reconstructed part of the current frame (1500) and can use the corresponding block as a prediction block (e.g., the prediction block (1502)). The encoder can signal the usage of the IntraTMP mode, and the same prediction operation such as described above can be performed at a decoder side by a decoder.

As described above, the prediction signal can be generated by matching the current template (1511) (e.g., the L-shaped causal neighbor) of the current block (1501) with a template of another block (e.g., the prediction block (1502)) in the predefined search range. Referring to FIG. 15, the search range can include multiple CTUs, such as the CTUs R1-R4. The search range can be pre-defined. In an embodiment, only the reconstructed area (e.g., R2-R4 and the regions (1521)-(1523) in FIG. 15) in the pre-defined search range can be searched. Further, in some examples, certain reconstructed areas (e.g., the regions (1522)-(1523) that are the above neighbor and the left neighbor of the current block (1501)) that are adjacent to the current block (1501) are not be searched. Thus, in the example shown in FIG. 15, the search area (1510) that is within the pre-defined search range includes R2-R4 and the region (1521).

Within a search range (also referred to as a search region), the decoder can search for a reference template that has the least TM cost (e.g., the least SAD) with respect to the current template (1511) and can use a corresponding block of the reference template as a prediction block (e.g., (1502)). Dimensions of the search range, such as a search range width SearchRange_w and a search range height SearchRange_h, can be set to be proportional to the block dimensions, such as a block width BlkW and a block height BlkH, respectively, for example, to have a fixed number of template comparisons (e.g., SAD comparisons) per pixel.

$$SearchRange\_w = a \times BlkW \qquad \text{Eq. 1}$$

$$SearchRange\_h = a \times BlkH \qquad \text{Eq. 2}$$

A parameter 'a' in Eqs. 1-2 is a constant that controls the gain and complexity trade-off. In an example, 'a' in Eqs. 1-2 is 5. The parameter 'a' in Eqs. 1-2 can be constrained so that the search range is within multiple CTUs (e.g., 4 CTUs shown in FIG. In an example, the search area (1510) is within the search range.

The IntraTMP mode can be enabled for CUs with sizes less than or equal to 64 in a width and a height. For example, the IntraTMP mode is enabled when a CU or a block is less than 64×64. The maximum CU size for the IntraTMP mode can be configurable. The IntraTMP mode can be signaled at a CU level through a dedicated flag, for example, when a decoder side intra mode derivation (DIMD) is not used for a current CU.

Figure 16:
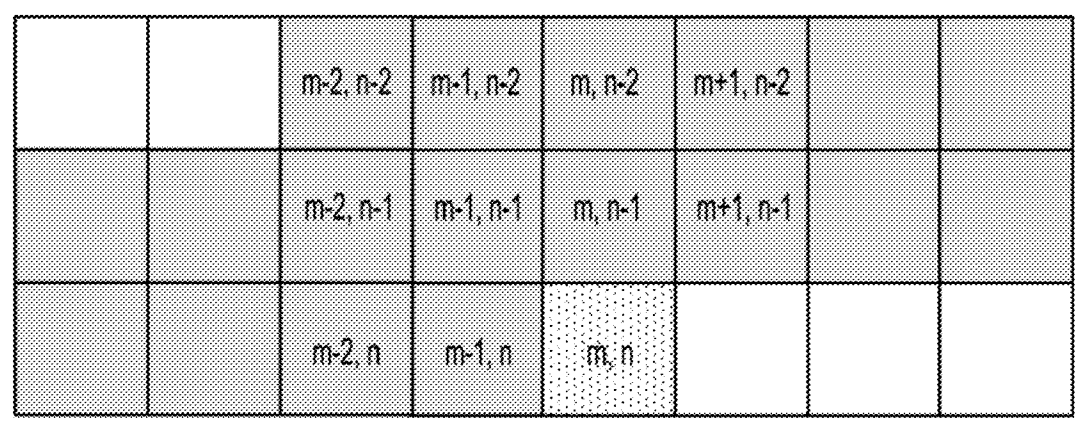

In an example, such as in ECMS, the IntraTMP mode accesses 320 upper samples and 320 left samples to support a 64×64 block. The memory size, such as 320 upper samples and 320 left samples of a block, can improve the coding efficiency of the IBC mode. The reference area or the search range for the IBC mode can be extended. In an example, the reference area for the IBC mode is extended to two CTU rows above. FIG. 16 shows an example of the reference area for coding a CTU (m, n). Integers m and n are indices representing a position of a CTU. To code CTU (m, n), the reference area can include CTUs with indices (m−2, n−2), . . . , (W−1, n−2), (0, n−1) (W−1, n−1), (0, n), and (m, n), where W denotes a maximum horizontal index for a CTU within a current tile, a slice, a picture, or the like. The setting (e.g., accessing 320 upper samples and 320 left samples to predict a block) can ensure that for a CTU size of 128×128, the IBC mode does not require extra memory in the current test Model of Essential Video Coding (ETM) platform. The per-sample block vector search range (or referred to as a local search range) can be limited to [—(C<<1), C>>2] (or [−2C, ¼C]) horizontally and [—C, C>>2] (or [−C, ¼C]) vertically to adapt to the reference area extension. C denotes the CTU size, such as 128. For example, a BV of a block is limited to be with [−2C, ¼C]) horizontally and [−C, ¼C]) vertically.

In some embodiments, such as described above, the template-matching search procedure is used to find the best template within the search range in the IntraTMP mode. A block vector $BV_{IntraTMP}$ (e.g., (1530)) between the searched reference template (e.g., (1512)) and the current template (e.g., (1511)) of the IntraTMP coded block (e.g., (1501)) is not stored, and thus cannot be used to code another block either in the IBC mode or the IntraTMP mode.

The disclosure describes embodiments related to the construction of an IBC candidate list (e.g., an IBC merge list or an IBC AMVP list) based on motion data of a block coded with the IntraTMP mode. The motion data of the IntraTMP coded block can be stored into the motion storage to construct the IBC candidate list (e.g., the IBC merge list), for example, the block vector $BV_{IntraTMP}$ is stored in a motion buffer as a predictor to predict another block.

According to an embodiment of the disclosure, a block vector ($BV_{IntraTMP}$) (e.g., (1530)) used in the IntraTMP mode between a searched reference template (e.g., (1512)) and a current template (e.g., (1511)) of a current block (e.g., (1501)) to be coded in the IntraTMP mode can be stored. The stored block vector ($BV_{IntraTMP}$) can be used to code (e.g., reconstruct or encode) another block, such as another block in the IntraTMP mode or in the IBC mode. The other block can be in a current picture that includes the current block or in a picture that is different from the current picture.

In an embodiment, the storage of the block vector ($BV_{IntraTMP}$) is similar or identical to the storage of a BV used in the IBC mode, as describe below. The current block can include one or more M×N units (e.g., in luma samples). For example, each M×N unit includes M×N samples. Integers M and N can be identical or different. The block vector ($BV_{IntraTMP}$) can be stored in an M×N unit, such as an 8×8 unit (e.g., in VVC) or a 4×4 unit (e.g., in ECM). The block vector ($BV_{IntraTMP}$) can be stored in each M×N unit of the current block.

In an embodiment, the block vector ($BV_{IntraTMP}$) is stored using a pre-defined precision, such as ½-pixel (½-pel), 1-pixel (1-pel), 2-pixel (2-pel), or the like. In an example, the pre-defined precision is the only allowed precision to store the block vector ($BV_{IntraTMP}$).

In another embodiment, the block vector ($BV_{IntraTMP}$) is stored using one precision in a list of pre-defined precisions. The list of pre-defined precisions can include but is not limited to ¼-pixel (¼-pel), ½-pel, 1-pel, and 4-pixel (or 4-pel). An index or other information can be signaled indicating which precision in the list of pre-defined precisions can be selected to store the block vector ($BV_{IntraTMP}$). The precision can be selected based on the index. The list of pre-defined precisions can include additional precision(s) or omit one or more precisions.

In an embodiment, the current block is coded with the IntraTMP mode. Reference template(s) indicated by (i) BV(s) associated with block(s) that are already coded with the IBC mode and/or (ii) block vectors ($BV_{S_{IntraTMP}}$) associated with block(s) that are already coded with the IntraTMP mode can be used as template matching candidates in the IntraTMP mode. In an example, a starting reference template indicated by one of (i) the BV(s) and/or (ii) the block vectors ($BV_{S_{IntraTMP}}$) can be used as a starting point (e.g., the first template candidate among multiple template candidates) in the template matching used in the IntraTMP mode. A TM cost is determined based on the starting reference template and the current template of the current block.

In an embodiment, the current block is coded using the IntraTMP mode. Whether to store the block vector ($BV_{IntraTMP}$) of the current block can depend on the TM cost C that is based on the current template (e.g., (1511)) of the current block (e.g., (1501)) and the reference template (e.g., (1512)) of the prediction block (e.g., (1502)). For example, if the TM cost C is below a given threshold, the block vector ($BV_{IntraTMP}$) of the current block is stored. If the TM cost C is not below the given threshold, the block vector ($BV_{IntraTMP}$) of the current block is not stored.

In an embodiment, the TM cost C is normalized, for example, with respect to a size of the current template (e.g., a number of samples $N_{CT}$ in the current template). For example, the normalized TM cost CN is equal to $C/N_{CT}$. The normalized TM cost $C_N$ can be stored, and the TM cost C is not stored.

In an embodiment, a partial TM cost associated with an M×N unit of the current block that is IntraTMP coded is stored. The partial TM cost can be determined based on a subset of the current template (e.g., (1511)) and a subset of the reference template (e.g., (1512)) that correspond to the M×N unit.

As described above, the stored block vector ($BV_{IntraTMP}$) of the current block coded with the IntraTMP mode can be used to code another block in the IBC mode. In an embodiment, a first block in a current picture is to be coded in the IBC mode. An IBC candidate list of the first block can be constructed. The IBC candidate list can include a first candidate that is based on a block vector ($BV_{IntraTMP}$) of a second block coded with the IntraTMP mode, such as the block vector ($BV_{IntraTMP}$) (1530) shown in FIG. 15. The first candidate can be used as a BVP candidate in the IBC candidate list. In an example, the first candidate is the block vector ($BV_{IntraTMP}$) of the second block coded with the IntraTMP mode. The second block can be one of (i) a reconstructed block in the current picture and (ii) a temporal neighbor of the first block. In an example, the reconstructed block in the current picture is a spatial neighbor of the first block. In an example, the reconstructed block in the current picture is not adjacent to the first block, for example, the block vector ($BV_{IntraTMP}$) of the second block is stored in a history-based table, such as a BV history table as used in HBVPs.

In an example, the IBC mode is the IBC merge mode, and thus the IBC candidate list is an IBC merge candidate list (or an IBC merge list). In an example, the IBC mode is the IBC AMVP mode (or the IBC regular mode), and thus the IBC candidate list is an IBC BV predictor (BVP) list.

BV(s) of IBC coded block(s) and/or block vector(s) (BV(s)IntraTMP) of IntraTMP coded block(s) can be used as BVP candidate(s) in the IBC candidate list, for example, if the IBC coded block(s) and/or the IntraTMP coded block(s) are spatial and/or temporal neighbor(s) of the first block. In addition, BV(s) of IBC coded block(s) and/or block vector(s) (BV(s)IntraTMP) of IntraTMP coded block(s) can be used as BVP candidate(s) in the IBC candidate list if the BV(s) and/or block vector(s) (BV(s) IntraTMP) are in the history-based table, such as the BV history table as used in HBVPs.

The BVP candidate(s) based on the block vector(s) (BV(s)IntraTMP) can be referred to as IntraTMP-based BVP candidates, and the BVP candidate(s) based on the BV(s) can be referred to as IBC-based BVP candidates.

In an embodiment, template matching described in FIG. 13 can be applied to refine the block vector ($BV_{IntraTMP}$) of the second block, and a refined block vector ($BV_{IntraTMP}$) of the second block is determined. The first candidate in the IBC candidate list can be the refined block vector ($BV_{IntraTMP}$) of the second block.

In an embodiment, the IBC candidate list (e.g., the IBC merge list or the IBC BVP list) of the first block includes multiple IBC candidates (e.g., BVP candidates). The multiple BVP candidates can include the BV(s) of the IBC coded block(s) and/or the block vector(s) (BV(s)IntraTMP) of the IntraTMP coded block(s), as described above. In an example, the multiple BVP candidates includes the first candidate that is a block vector ($BV_{IntraTMP}$). A TM cost of each BVP candidate can be determined based on a current template of the first block and a reference template indicated by the respective BVP candidate, such as described in FIG.

13. The multiple BVP candidates can be reordered based on the determined TM costs, for example, in an ascending order of the determined TM costs. A sorted (e.g., reordered) IBC candidate list is formed. An index can indicate a BVP candidate in the reordered IBC candidate list.

In an embodiment, for each of the multiple BVP candidates that is a block vector ($BV_{IntraTMP}$), a scaling factor is applied to the TM cost of the respective BVP candidate.

In an embodiment, a maximum number of IntraTMP-based BVP candidates in the IBC candidate list that are based on block vector(s) (BV(s)IntraTMP) of block(s) coded in the IntraTMP mode is a threshold M. The IntraTMP coded block(s) can include spatial and/or temporal neighbor(s) of the first block. The block vector(s) (BV(s)IntraTMP) can also be obtained from the history-based table, such as described above.

In an example, the number of the IntraTMP-based BVP candidate(s) in the IBC candidate list equals the threshold M. A third block (e.g., a block j) is one of (i) a reconstructed block (e.g., a spatial neighbor of the first block) in the current picture and (ii) a temporal neighbor of the first block, and the third block is coded in the IntraTMP mode. In an example, the third block is a neighboring block j of the first block. Whether to include a block vector $BV_{IntraTMP}$ of the third block into the IBC candidate list can be determined based at least on a TM cost associated with the block vector $BV_{IntraTMP}$ of the third block. If the TM cost associated with the block vector $BV_{IntraTMP}$ of the third block is smaller than a TM cost associated with at least one of the IntraTMP-based BVP candidate(s), the block vector $BV_{IntraTMP}$ of the third block can replace a candidate of the IntraTMP-based BVP candidate(s). The replaced candidate can have the largest TM cost among the IntraTMP-based BVP candidate(s).

When constructing the IBC candidate list, IntraTMP-based BVP candidate(s) and IBC-based BVP candidate(s) can be added in any suitable order.

In an embodiment, block vector(s) (BV(s)IntraTMP) from the (i) spatial or temporal neighboring block(s) coded in the IntraTMP mode and/or (ii) the history-based table can be added as IntraTMP-based BVP candidate(s) into the IBC candidate list when constructing the IBC candidate list. In an example, the IntraTMP-based BVP candidate(s) are added into the IBC candidate list prior to adding BV(s) of IBC coded block(s). In an example, only the IntraTMP-based BVP candidate(s) with M smallest TM costs are added into the IBC candidate list. When a number of the IntraTMP-based BVP candidate(s) reaches (e.g., equals) the threshold M, the BV(s) of the IBC coded block(s) can be added into the IBC candidate list. The IBC coded block(s) can include spatial or temporal neighboring block(s) of the first block. In an example, the IBC coded block(s) include other reconstructed block(s) in the current picture, and the BV(s) of the other reconstructed block(s) in the current picture are stored, for example, in the history-based buffer, such as as used in HBVP.

In an example, IBC-based BVP candidate(s) from BV(s) of IBC coded block(s) are added into the IBC candidate list, and subsequently, IntraTMP-based BVP candidate(s) from block vector(s) (BV(s)IntraTMP) of IntraTMP coded block(s) can be added into the IBC candidate list.

In an embodiment, a block vector ($BV_{IntraTMP}$) of an IntraTMP coded block may be added to a BV history table and can be used as history-based BV candidate/predictor derivation, for example, when an IBC candidate list is constructed, as described above.

Figure 17:
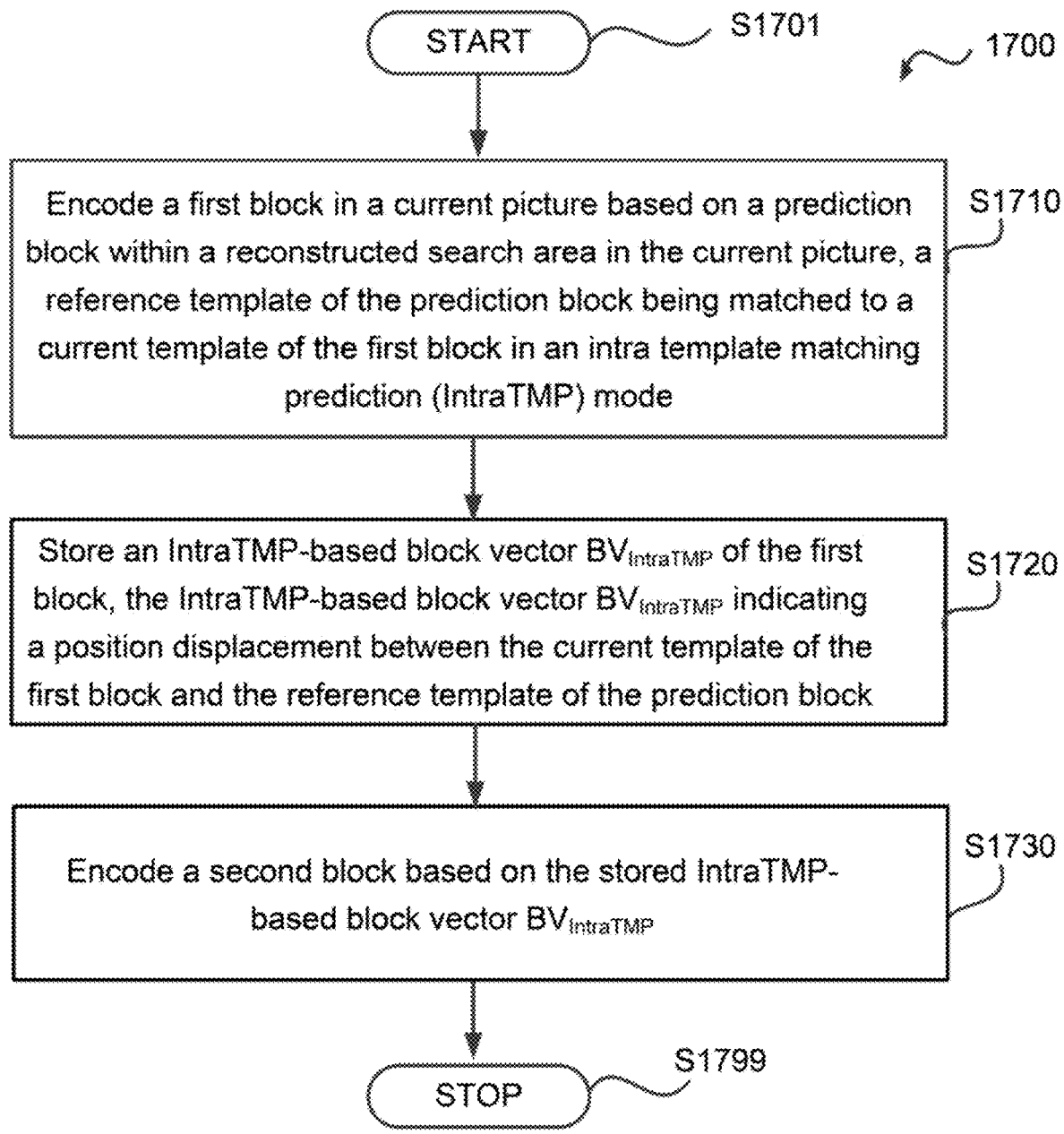
FIG. 17 shows a flow chart outlining an encoding process according to an embodiment of the disclosure.

FIG. 17 shows a flow chart outlining an encoding process (1700) according to an embodiment of the disclosure. The process (1700) can be used in a video encoder. The process (1700) can be executed by an apparatus for video coding that can include processing circuitry. In various embodiments, the process (1700) is executed by the processing circuitry, such as the processing circuitry in the terminal devices (310), (320), (330) and (340), processing circuitry that performs functions of a video encoder (e.g., (403), (603), (703)), or the like. In some embodiments, the process (1700) is implemented in software instructions, thus when the processing circuitry executes the software instructions, the processing circuitry performs the process (1700). The process starts at (S1701), and proceeds to (S1710).

At (S1710), a first block in a current picture can be encoded based on a prediction block within a reconstructed search area in the current picture with an intra template matching prediction (IntraTMP) mode. A reference template of the prediction block is matched to a current template of the first block.

In an embodiment, the reference template is determined based on multiple template candidates within the reconstructed search area in the current picture. A position displacement between one of the multiple template candidates and the current template can be indicated by a vector that is (i) a block vector (BV) of a third block coded with the IBC mode or (ii) a block vector $BV_{IntraTMP}$ of the third block coded with the IntraTMP mode.

At (S1720), a block vector (e.g., an IntraTMP-based block vector) $BV_{IntraTMP}$ of the first block can be stored. The block vector $BV_{IntraTMP}$ indicates a position displacement between the current template of the first block and the reference template of the prediction block.

In an embodiment, the first block includes one or more units where each unit include M×N samples. The block vector $BV_{IntraTMP}$ can be stored in each M×N unit of the first block.

In an example, the block vector $BV_{IntraTMP}$ is stored with a pre-defined allowed precision. In an example, the block vector $BV_{IntraTMP}$ is stored with one of pre-defined precisions.

In an example, the block vector $BV_{IntraTMP}$ is stored if a storing condition is satisfied. The storing condition includes that a template matching cost between the reference template of the prediction block and the current template of the first block is less than a threshold.

In an example, a template matching cost between the reference template of the prediction block and the current template of the first block is stored. For example, the template matching cost is normalized based on a number of samples in the current template, and the normalized template matching cost is stored.

At (S1730), a second block can be encoded based on the stored block vector $BV_{IntraTMP}$. In an example, the second block is coded with the IntraTMP mode or an intra block copy (IBC) mode. For example, an IBC candidate list of the second block includes a BVP candidate that is based on the stored block vector $BV_{IntraTMP}$. The second block can be encoded based on the IBC candidate list.

The process (1700) then proceeds to (S1799), and terminates.

The process (1700) can be suitably adapted to various scenarios and steps in the process (1700) can be adjusted accordingly. One or more of the steps in the process (1700) can be adapted, omitted, repeated, and/or combined. Any suitable order can be used to implement the process (1700). Additional step(s) can be added.

Figure 18:
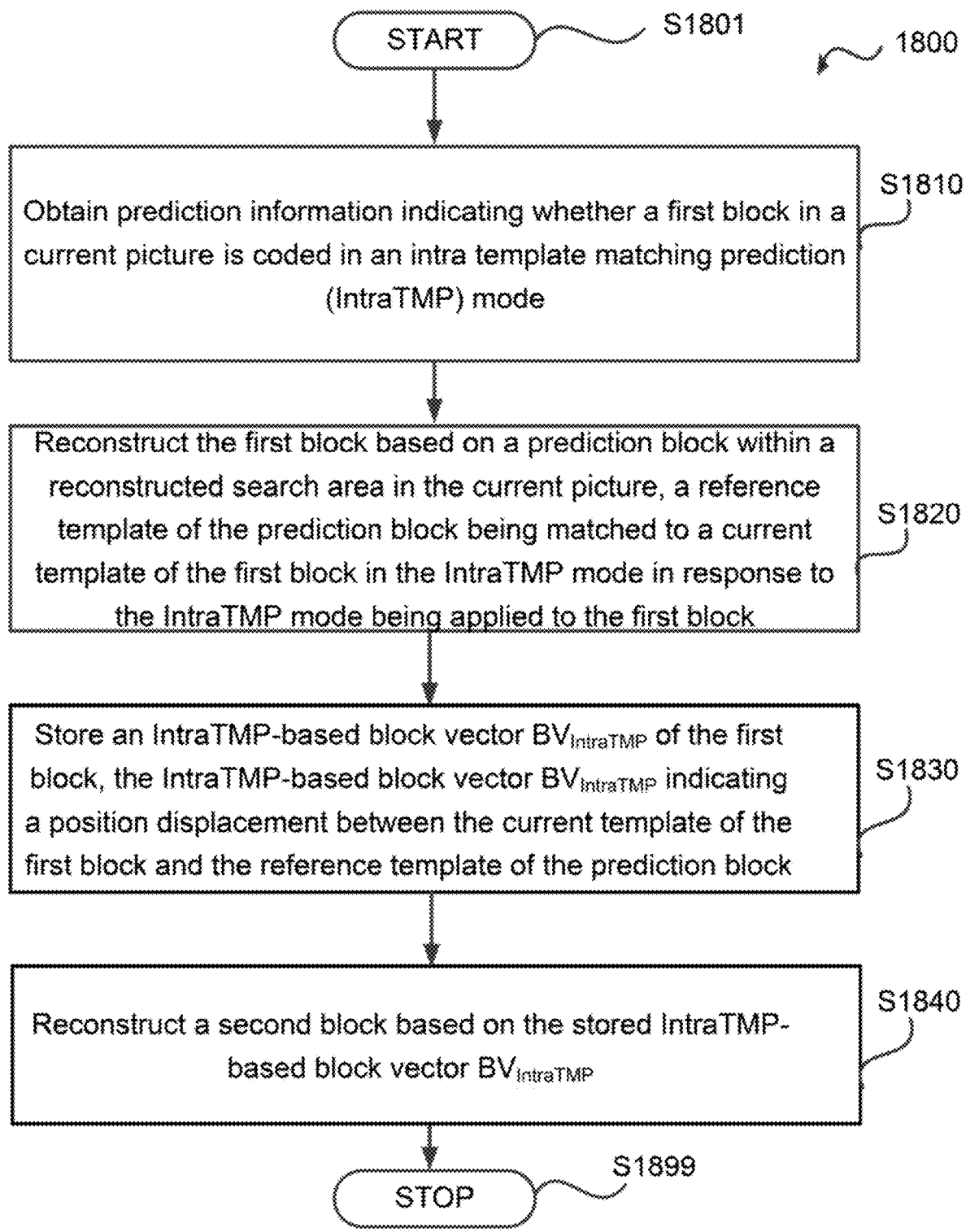
FIG. 18 shows a flow chart outlining a decoding process according to an embodiment of the disclosure.

FIG. 18 shows a flow chart outlining a decoding process (1800) according to an embodiment of the disclosure. The process (1800) can be used in a video decoder. The process (1800) can be executed by an apparatus for video coding that can include receiving circuitry and processing circuitry. In various embodiments, the process (1800) is executed by the processing circuitry, such as the processing circuitry in the terminal devices (310), (320), (330) and (340), the processing circuitry that performs functions of the video encoder (403), the processing circuitry that performs functions of the video decoder (410), the processing circuitry that performs functions of the video decoder (510), the processing circuitry that performs functions of the video encoder (603), and the like. In some embodiments, the process (1800) is implemented in software instructions, thus when the processing circuitry executes the software instructions, the processing circuitry performs the process (1800). The process starts at (S1801), and proceeds to (S1810).

At (S1810), prediction information indicating whether a first block in a current picture is coded in an intra template matching prediction (IntraTMP) mode is obtained. A coded video bitstream comprising the first block in the current picture can be received. In an example, the prediction information is decoded from the coded video bitstream.

At (S1820), the first block can be reconstructed based on a prediction block within a reconstructed search area in the current picture if the prediction information indicates that the IntraTMP mode is applied to the first block. A reference template of the prediction block can be matched to a current template of the first block in the IntraTMP mode.

In an embodiment, the reference template is determined based on multiple template candidates within the reconstructed search area in the current picture. A position displacement between one of the multiple template candidates and the current template can be indicated by a vector that is (i) a block vector (BV) of a third block coded with the IBC mode or (ii) a block vector $BV_{IntraTMP}$ of the third block coded with the IntraTMP mode.

At (S1830), a block vector (e.g., an IntraTMP-based block vector) $BV_{IntraTMP}$ of the first block can be stored. The block vector $BV_{IntraTMP}$ indicates a position displacement (or a motion vector displacement) between the current template of the first block and the reference template of the prediction block.

In an embodiment, the first block includes one or more units where each unit include M×N samples. The block vector $BV_{IntraTMP}$ can be stored in each M×N unit of the first block.

In an example, the block vector $BV_{IntraTMP}$ is stored with a pre-defined allowed precision. In an example, the block vector $BV_{IntraTMP}$ is stored with a precision indicated by syntax information (e.g., an index) in the coded video bitstream.

In an example, the block vector $BV_{IntraTMP}$ is stored if a storing condition is satisfied. The storing condition includes that a template matching cost between the reference template of the prediction block and the current template of the first block is less than a threshold.

In an example, a template matching cost between the reference template of the prediction block and the current template of the first block is stored. For example, the template matching cost is normalized based on a number of samples in the current template, and the normalized template matching cost is stored.

At (S1840), a second block can be reconstructed based on the stored block vector $BV_{IntraTMP}$. In an example, the second block is coded with the IntraTMP mode or an intra block copy (IBC) mode. In an example, the second block is in the current picture. For example, an IBC candidate list of the second block includes a BVP candidate that is based on the stored block vector $BV_{IntraTMP}$. The second block can be reconstructed based on the IBC candidate list.

The process (1800) proceeds to (S1899), and terminates.

The process (1800) can be suitably adapted to various scenarios and steps in the process (1800) can be adjusted accordingly. One or more of the steps in the process (1800) can be adapted, omitted, repeated, and/or combined. Any suitable order can be used to implement the process (1800). Additional step(s) can be added.

Figure 19:
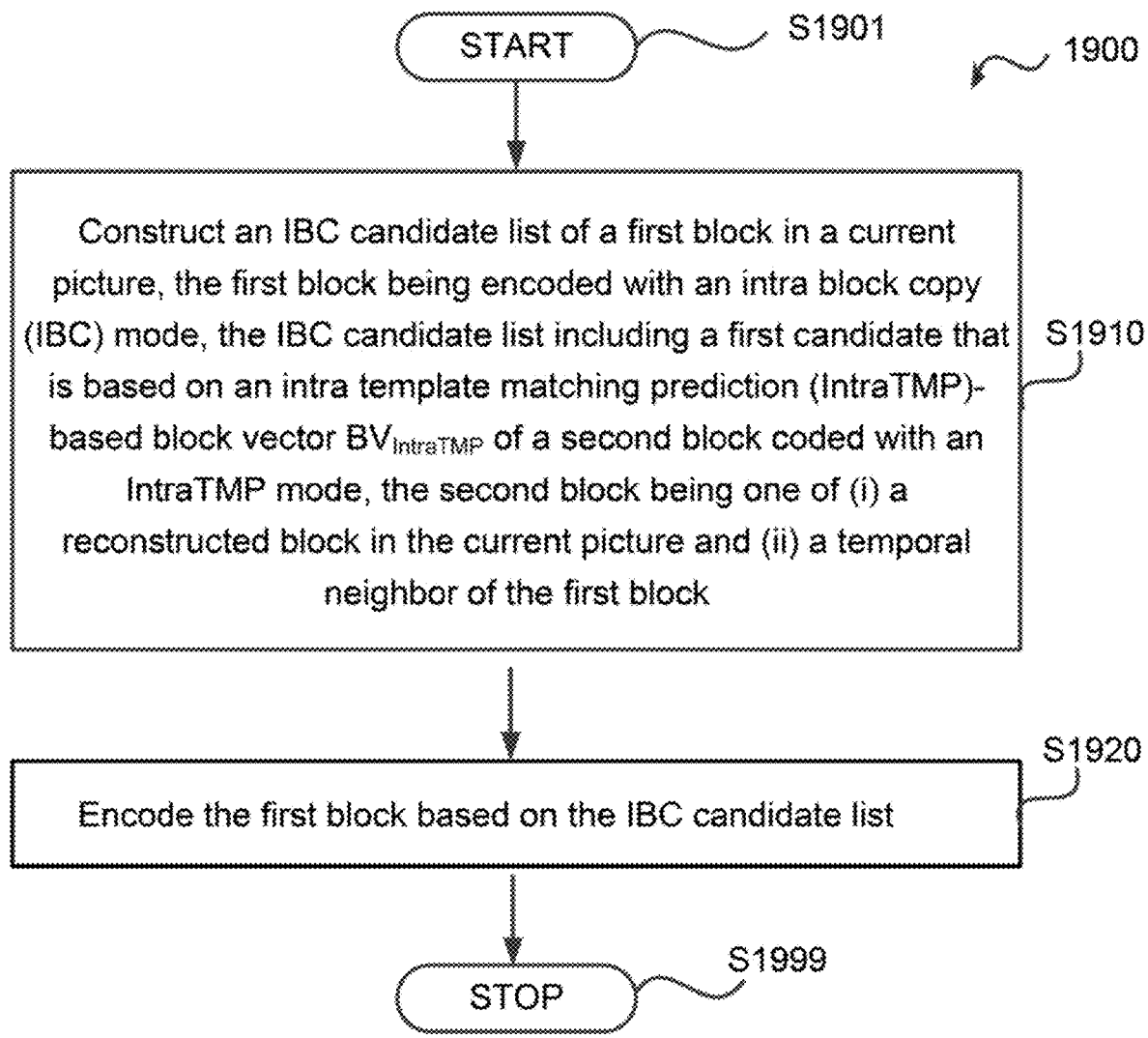
FIG. 19 shows a flow chart outlining an encoding process according to an embodiment of the disclosure.

FIG. 19 shows a flow chart outlining an encoding process (1900) according to an embodiment of the disclosure. The process (1900) can be used in a video encoder. The process (1900) can be executed by an apparatus for video coding that can include processing circuitry. In various embodiments, the process (1900) is executed by the processing circuitry, such as the processing circuitry in the terminal devices (310), (320), (330) and (340), processing circuitry that performs functions of a video encoder (e.g., (403), (603), (703)), or the like. In some embodiments, the process (1900) is implemented in software instructions, thus when the processing circuitry executes the software instructions, the processing circuitry performs the process (1900). The process starts at (S1901), and proceeds to (S1910).

At (S1910), an IBC candidate list of a first block in a current picture can be constructed. The first block is encoded with an intra block copy (IBC) mode. The IBC candidate list of the first block can include a first candidate that is based on a block vector $BV_{IntraTMP}$ of a second block coded with an intra template matching prediction (IntraTMP) mode. The second block can be one of (i) a reconstructed block in the current picture and (ii) a temporal neighbor of the first block.

In an embodiment, template matching is performed on the block vector $BV_{IntraTMP}$ to refine the block vector $BV_{IntraTMP}$. The first candidate can be determined as the template-matched block vector $BV_{IntraTMP}$.

At (S1920), the first block can be encoded based on the IBC candidate list.

The process (1900) then proceeds to (S1999), and terminates.

The process (1900) can be suitably adapted to various scenarios and steps in the process (1900) can be adjusted accordingly. One or more of the steps in the process (1900) can be adapted, omitted, repeated, and/or combined. Any suitable order can be used to implement the process (1900). Additional step(s) can be added.

In an embodiment, the IBC candidate list of the first block includes multiple candidates. Each of the multiple candidates can be based on one of (i) a block vector $BV_{IntraTMP}$ of a block coded with the IntraTMP mode and (ii) a block vector (BV) of a block coded with the IBC mode. The multiple candidates includes the first candidate. Template matching can be performed on the multiple candidates as follows. For each of the multiple candidates, a respective template matching cost can be determined based on a reference template of a reference block and a current template of the first block. The multiple candidates can be reordered based on the determined template matching costs. The first block can be reconstructed based on the reordered multiple candidates in the IBC candidate list.

In an example, for each of the multiple candidates that is a block vector $BV_{IntraTMP}$, a scaling factor is applied to the template matching cost of the respective candidate.

In an example, a number of one or more candidates in the IBC candidate list that are block vectors $BV_{S_{IntraTMP}}$ of respective blocks coded with the IntraTMP mode is less than or equal to a threshold. The one or more candidates includes the first candidate.

In an example, the number of the one or more candidates in the IBC candidate list equals the threshold. A third block is one of (i) a reconstructed block in the current picture and (ii) a temporal neighbor of the first block. For a new block vector $BV_{IntraTMP}$ of the third block that is not in the IBC candidate list, if a template-matching cost associated with the new block vector $BV_{IntraTMP}$ is smaller than a template-matching cost associated with at least one of the one or more candidates, a candidate of the one or more candidates is replaced with the new block vector $BV_{IntraTMP}$. The replaced candidate has the largest template-matching cost among the one or more candidates.

In an example, candidate(s) from block(s) coded with the IBC mode is added to the IBC candidate list.

In an example, the block vector $BV_{IntraTMP}$ of the second block is obtained from a block vector (BV) history table storing one or more BVs or one or more block vectors $BV_{S_{IntraTMP}}$ of at least one previously coded block in the current picture.

Figure 20:
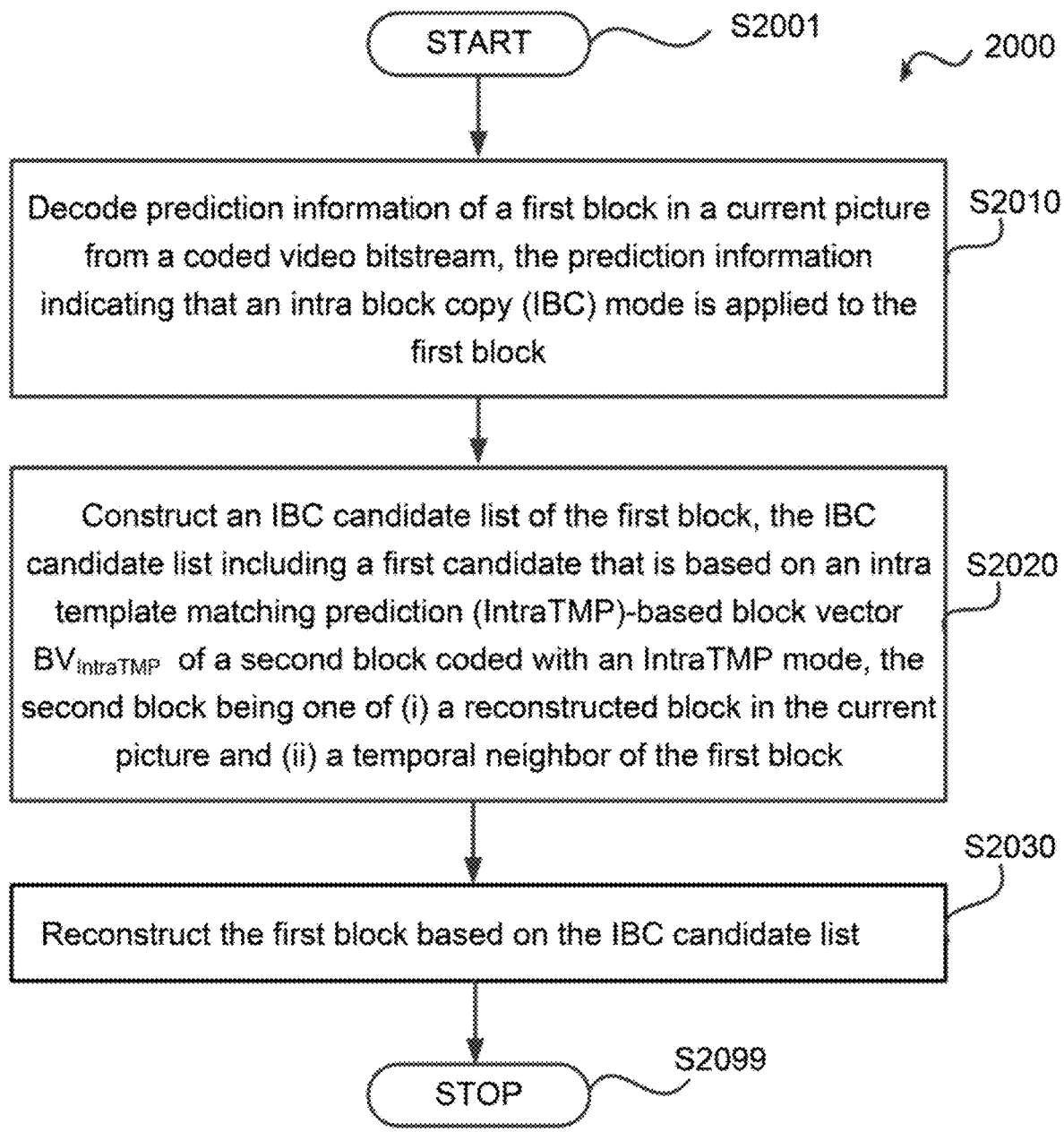
FIG. 20 shows a flow chart outlining a decoding process according to an embodiment of the disclosure.

FIG. 20 shows a flow chart outlining a decoding process (2000) according to an embodiment of the disclosure. The process (2000) can be used in a video decoder. The process (2000) can be executed by an apparatus for video coding that can include receiving circuitry and processing circuitry. In various embodiments, the process (2000) is executed by the processing circuitry, such as the processing circuitry in the terminal devices (310), (320), (330) and (340), the processing circuitry that performs functions of the video encoder (403), the processing circuitry that performs functions of the video decoder (410), the processing circuitry that performs functions of the video decoder (510), the processing circuitry that performs functions of the video encoder (603), and the like. In some embodiments, the process (2000) is implemented in software instructions, thus when the processing circuitry executes the software instructions, the processing circuitry performs the process (2000). The process starts at (S2001), and proceeds to (S2010).

At (S2010), prediction information of a first block in a current picture can be decoded from a coded video bitstream. The prediction information indicates that an intra block copy (IBC) mode is applied to the first block.

At (S2020), an IBC candidate list of the first block can be constructed. The IBC candidate list includes a first candidate that is based on a block vector $BV_{IntraTMP}$ of a second block coded with an intra template matching prediction (IntraTMP) mode. The second block can be one of (i) a reconstructed block in the current picture and (ii) a temporal neighbor of the first block.

In an embodiment, template matching is performed on the block vector $BV_{IntraTMP}$ to refine the block vector $BV_{IntraTMP}$. The first candidate can be determined as the template-matched block vector $BV_{IntraTMP}$.

At (S2030), the first block can be reconstructed based on the IBC candidate list.

The process (2000) proceeds to (S2099), and terminates.

The process (2000) can be suitably adapted to various scenarios and steps in the process (2000) can be adjusted accordingly. One or more of the steps in the process (2000) can be adapted, omitted, repeated, and/or combined. Any suitable order can be used to implement the process (2000). Additional step(s) can be added.

In an embodiment, the IBC candidate list of the first block includes multiple candidates. Each of the multiple candidates can be based on one of (i) a block vector $BV_{IntraTMP}$ of a block coded with the IntraTMP mode and (ii) a block vector (BV) of a block coded with the IBC mode. The multiple candidates includes the first candidate. Template matching can be performed on the multiple candidates as follows. For each of the multiple candidates, a respective template matching cost can be determined based on a reference template of a reference block and a current template of the first block. The multiple candidates can be reordered based on the determined template matching costs. The first block can be reconstructed based on the reordered multiple candidates in the IBC candidate list.

In an example, for each of the multiple candidates that is a block vector $BV_{IntraTMP}$, a scaling factor is applied to the template matching cost of the respective candidate.

In an example, a number of one or more candidates in the IBC candidate list that are block vectors $BV_{S_{IntraTMP}}$ of respective blocks coded with the IntraTMP mode is less than or equal to a threshold. The one or more candidates includes the first candidate.

In an example, the number of the one or more candidates in the IBC candidate list equals the threshold. A third block is one of (i) a reconstructed block in the current picture and (ii) a temporal neighbor of the first block. For a new block vector $BV_{IntraTMP}$ of the third block that is not in the IBC candidate list, if a template-matching cost associated with the new block vector $BV_{IntraTMP}$ is smaller than a template-matching cost associated with at least one of the one or more candidates, a candidate of the one or more candidates is replaced with the new block vector $BV_{IntraTMP}$. The replaced candidate has the largest template-matching cost among the one or more candidates.

In an example, one or more candidates from one or more blocks coded with the IBC mode is added to the IBC candidate list.

In an example, the block vector $BV_{IntraTMP}$ of the second block is obtained from a block vector (BV) history table storing one or more BVs or one or more block vectors $BV_{S_{IntraTMP}}$ of at least one previously coded block in the current picture.

Embodiments in the disclosure may be used separately or combined in any order. Further, each of the methods (or embodiments), an encoder, and a decoder may be implemented by processing circuitry (e.g., one or more processors or one or more integrated circuits). In one example, the one or more processors execute a program that is stored in a non-transitory computer-readable medium.

The techniques described above can be implemented as computer software using computer-readable instructions and physically stored in one or more computer-readable media. For example, FIG. 21 shows a computer system (2100) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 21:
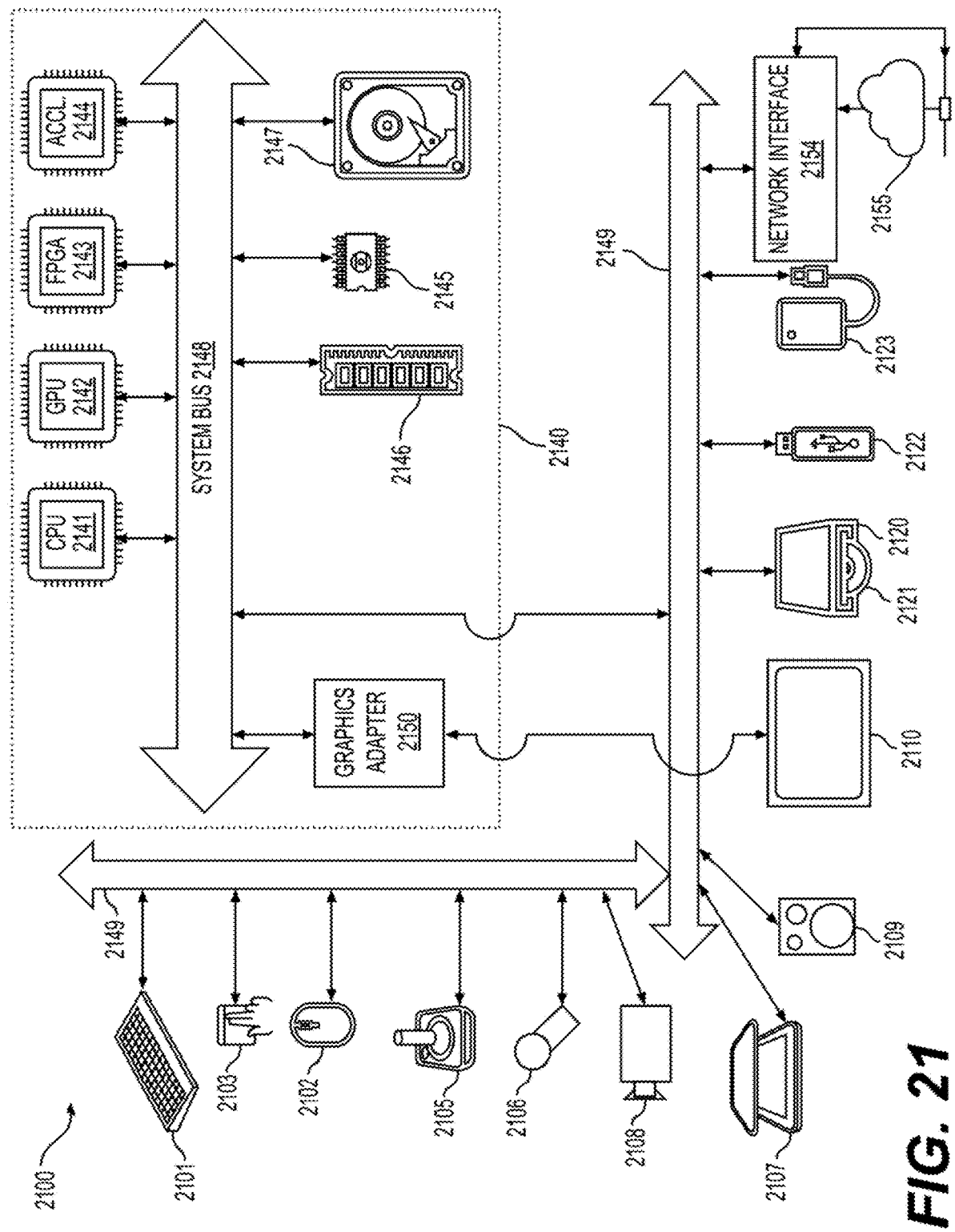
FIG. 21 is a schematic illustration of a computer system in accordance with an embodiment.

The components shown in FIG. 21 for computer system (2100) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (2100).

Computer system (2100) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (2101), mouse (2102), trackpad (2103), touch-screen (2110), data-glove (not shown), joystick (2105), microphone (2106), scanner (2107), camera (2108).

Computer system (2100) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (2110), data-glove (not shown), or joystick (2105), but there can also be tactile feedback devices that do not serve as input devices), audio output devices (such as: speakers (2109), headphones (not depicted)), visual output devices (such as touch-screens (2110) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (2100) can also include human accessible storage devices and their associated media such as optical media including CD/DVD ROM/RW (2120) with CD/DVD or the like media (2121), thumb-drive (2122), removable hard drive or solid state drive (2123), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (2100) can also include an interface (2154) to one or more communication networks (2155). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (2149) (such as, for example USB ports of the computer system (2100)); others are commonly integrated into the core of the computer system (2100) by attachment to a system bus as described below (for example Ethernet interface into a PC computer system or cellular network interface into a smartphone computer system). Using any of these networks, computer system (2100) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (2140) of the computer system (2100).

The core (2140) can include one or more Central Processing Units (CPU) (2141), Graphics Processing Units (GPU) (2142), specialized programmable processing units in the form of Field Programmable Gate Areas (FPGA) (2143), hardware accelerators (2144) for certain tasks, graphics adapters (2150), and so forth. These devices, along with Read-only memory (ROM) (2145), Random-access memory (2146), internal mass storage (2147) such as internal non-user accessible hard drives, SSDs, and the like, may be connected through a system bus (2148). In some computer systems, the system bus (2148) can be accessible in the form of one or more physical plugs to enable extensions by additional CPUs, GPU, and the like. The peripheral devices can be attached either directly to the core's system bus (2148), or through a peripheral bus (2149). In an example, the touch-screen (2110) can be connected to the graphics adapter (2150). Architectures for a peripheral bus include PCI, USB, and the like.

CPUs (2141), GPUs (2142), FPGAs (2143), and accelerators (2144) can execute certain instructions that, in combination, can make up the aforementioned computer code. That computer code can be stored in ROM (2145) or RAM (2146). Transitional data can be stored in RAM (2146), whereas permanent data can be stored for example, in the internal mass storage (2147). Fast storage and retrieve to any of the memory devices can be enabled through the use of cache memory, that can be closely associated with one or more CPU (2141), GPU (2142), mass storage (2147), ROM (2145), RAM (2146), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system (2100) having architecture, and specifically the core (2140) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (2140) that are of non-transitory nature, such as core-internal mass storage (2147) or ROM (2145). The software implementing various embodiments of the present disclosure can be stored in such devices and executed by core (2140). A computer-readable medium can include one or more memory devices or chips, according to particular needs. The software can cause the core (2140) and specifically the processors therein (including CPU, GPU, FPGA, and the like) to execute particular processes or particular parts of particular processes described herein, including defining data structures stored in RAM (2146) and modifying such data structures according to the processes defined by the software. In addition or as an alternative, the computer system can provide functionality as a result of logic hardwired or otherwise embodied in a circuit (for example: accelerator (2144)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

Appendix A: Acronyms

JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit
R-D: Rate-Distortion While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video decoding in a video decoder, comprising:
receiving a coded video bitstream comprising a first block in a current picture;
obtaining prediction information indicating whether the first block is coded in an intra template matching prediction (IntraTMP) mode;
when the IntraTMP mode is applied to the first block,
determining a reference template based on multiple template candidates within a reconstructed search area in the current picture, a position displacement between one of the multiple template candidates and the current template being indicated by a vector that is (i) a block vector (BV) of a third block coded with an Intra Block Copy (IntraBC) or (ii) an IntraTMP-based block vector $BV_{IntraTMP}$ of the third block coded with the IntraTMP mode;
reconstructing the first block based on a prediction block within the reconstructed search area in the current picture, the reference template of the prediction block being matched to the current template of the first block in the IntraTMP mode;
storing an IntraTMP-based block vector $BV_{IntraTMP}$ of the first block, the IntraTMP-based block vector $BV_{IntraTMP}$ indicating a position displacement between the current template of the first block and the reference template of the prediction block; and
reconstructing a second block based on the stored IntraTMP-based block vector $BV_{IntraTMP}$, wherein the second block is coded in either the IntraBC mode or the IntraTMP mode.

2. The method of claim 1, wherein
the first block includes one or more M×N units; and
the storing includes storing the IntraTMP-based block vector $BV_{IntraTMP}$ in each M×N unit of the first block.

3. The method of claim 1, wherein the storing the IntraTMP-based block vector $BV_{IntraTMP}$ comprises:
storing the IntraTMP-based block vector $BV_{IntraTMP}$ with a pre-defined allowed precision.

4. The method of claim 1, wherein the storing the IntraTMP-based block vector $BV_{IntraTMP}$ comprises:
storing the IntraTMP-based block vector $BV_{IntraTMP}$ with a precision indicated by syntax information in the coded video bitstream.

5. The method of claim 1, wherein the storing the IntraTMP-based block vector $BV_{IntraTMP}$ comprises:
storing the IntraTMP-based block vector $BV_{IntraTMP}$ based on a template matching cost between the reference template of the prediction block and the current template of the first block being less than a threshold.

6. The method of claim 1, wherein the storing the IntraTMP-based block vector $BV_{IntraTMP}$ further comprises:
storing a template matching cost between the reference template of the prediction block and the current template of the first block.

7. The method of claim 6, wherein the template matching cost is normalized based on a number of samples in the current template.

8. A method for video encoding in a video encoder, comprising:
determining whether a first block in a current picture of a video is encoded in an intra template matching prediction (IntraTMP) mode;

when the IntraTMP mode is applied to the first block,
determining a reference template based on multiple template candidates within a reconstructed search area in the current picture, a position displacement between one of the multiple template candidates and the current template being indicated by a vector that is (i) a block vector (BV) of a third block encoded with an Intra Block Copy (IntraBC) or (ii) an IntraTMP-based block vector $BV_{IntraTMP}$ of the third block encoded with the IntraTMP mode;
encoding the first block based on a prediction block within the reconstructed search area in the current picture, the reference template of the prediction block being matched to the current template of the first block in the IntraTMP mode;
storing an IntraTMP-based block vector $BV_{IntraTMP}$ of the first block, the IntraTMP-based block vector $BV_{IntraTMP}$ indicating a position displacement between the current template of the first block and the reference template of the prediction block; and
encoding a second block based on the stored IntraTMP-based block vector $BV_{IntraTMP}$, wherein the second block is encoded in either the IntraBC mode or the IntraTMP mode.

9. The method of claim 8, wherein
the first block includes one or more M×N units; and
the storing includes storing the IntraTMP-based block vector $BV_{IntraTMP}$ in each M×N unit of the first block.

10. The method of claim 8, wherein the storing the IntraTMP-based block vector $BV_{IntraTMP}$ comprises:
storing the IntraTMP-based block vector $BV_{IntraTMP}$ with a pre-defined allowed precision.

11. The method of claim 8, wherein the storing the IntraTMP-based block vector $BV_{IntraTMP}$ comprises:
storing the IntraTMP-based block vector $BV_{IntraTMP}$ with a precision.

12. The method of claim 8, wherein the storing the IntraTMP-based block vector $BV_{IntraTMP}$ comprises:
storing the IntraTMP-based block vector $BV_{IntraTMP}$ based on a template matching cost between the reference template of the prediction block and the current template of the first block being less than a threshold.

13. The method of claim 8, wherein the storing the IntraTMP-based block vector $BV_{IntraTMP}$ further comprises:
storing a template matching cost between the reference template of the prediction block and the current template of the first block.

14. The method of claim 13, wherein the template matching cost is normalized based on a number of samples in the current template.

15. A method of processing visual media data, the method comprising:
processing a bitstream that includes the visual media data according to a format rule, wherein
the bitstream includes prediction information of a first block in a current picture, the prediction information indicating an intra template matching prediction (IntraTMP) mode; and
the format rule specifies that:
when the IntraTMP mode is applied to the first block,
a reference template based on multiple template candidates within a reconstructed search area in the current picture is determined, a position displacement between one of the multiple template candidates and the current template being indicated by a vector that is (i) a block vector (BV) of a third block coded with an Intra Block Copy (IntraBC) or (ii) an IntraTMP-based block vector $BV_{IntraTMP}$ of the third block processed with the IntraTMP mode;
the first block is reconstructed based on a prediction block within the reconstructed search area in the current picture, the reference template of the prediction block being matched to the current template of the first block in the Intra TMP mode;
an IntraTMP-based block vector $BV_{IntraTMP}$ of the first block is stored, the IntraTMP-based block vector $BV_{IntraTMP}$ indicating a position displacement between the current template of the first block and the reference template of the prediction block; and
a second block is reconstructed based on the stored IntraTMP-based block vector $BV_{IntraTMP}$, wherein the second block is coded in either the IntraBC mode or the IntraTMP mode.

16. The method of claim 15, wherein
the first block includes one or more M×N units; and
the IntraTMP-based block vector $BV_{IntraTMP}$ in each M×N unit of the first block is stored.

17. The method of claim 15, wherein the format rule further specifies that:
the IntraTMP-based block vector $BV_{IntraTMP}$ is stored with a pre-defined allowed precision.

18. The method of claim 15, wherein the format rule further specifies that:
the IntraTMP-based block vector $BV_{IntraTMP}$ is stored with a precision.

19. The method of claim 15, wherein the format rule further specifies that:
the IntraTMP-based block vector $BV_{IntraTMP}$ is stored based on a template matching cost between the reference template of the prediction block and the current template of the first block being less than a threshold.

20. The method of claim 15, wherein the format rule further specifies that:
a template matching cost between the reference template of the prediction block and the current template of the first block is stored.

* * * * *